(12) United States Patent  
Hashimoto et al.

(10) Patent No.: US 7,984,290 B2  
(45) Date of Patent: Jul. 19, 2011

(54) SYSTEM AND METHOD FOR ENCRYPTED COMMUNICATION

(75) Inventors: Yoko Hashimoto, Kashiwa (JP); Takahiro Fujishiro, Yokohama (JP); Tadashi Kaji, Yokohama (JP); Osamu Takata, Tokyo (JP); Kazuyoshi Hoshino, Tokyo (JP); Shinji Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1362 days.

(21) Appl. No.: 11/436,048

(22) Filed: May 18, 2006

(65) Prior Publication Data

US 2006/0277406 A1    Dec. 7, 2006

(30) Foreign Application Priority Data

May 20, 2005  (JP) ................................. 2005-147488  
Mar. 31, 2006  (JP) ................................. 2006-096410

(51) Int. Cl.  
*H04L 29/06* (2006.01)

(52) U.S. Cl. ................. 713/155; 726/2; 726/14; 726/15

(58) Field of Classification Search .................. 726/3, 4, 726/14, 15; 713/155  
See application file for complete search history.

(56) References Cited

U.S. PATENT DOCUMENTS

| | | | |
|---|---|---|---|
| 7,024,553 B1 * | 4/2006 | Morimoto ..................... 713/163 |
| 7,257,581 B1 * | 8/2007 | Steele et al. ..................... 707/10 |
| 7,289,632 B2 * | 10/2007 | Buer ............................. 380/278 |
| 7,392,534 B2 * | 6/2008 | Lu et al. ............................ 726/5 |
| 7,536,544 B2 * | 5/2009 | Xiao .............................. 713/158 |
| 7,565,422 B2 * | 7/2009 | Campbell et al. ............. 709/223 |
| 7,584,505 B2 * | 9/2009 | Mondri et al. ................... 726/13 |
| 2001/0000358 A1 * | 4/2001 | Isomichi et al. ............... 713/201 |
| 2003/0026430 A1 * | 2/2003 | Aikawa et al. ................. 380/277 |
| 2003/0070095 A1 | 4/2003 | Okamoto et al. |
| 2003/0131259 A1 | 7/2003 | Barton et al. |
| 2004/0039925 A1 * | 2/2004 | McMillan et al. ............. 713/189 |
| 2004/0073795 A1 * | 4/2004 | Jablon ........................... 713/171 |
| 2005/0271211 A1 * | 12/2005 | Takemura ..................... 380/277 |
| 2007/0133803 A1 * | 6/2007 | Saito et al. ..................... 380/267 |

FOREIGN PATENT DOCUMENTS

EP      1 280 300        1/2003  
JP      2005-303486 A    10/2005

OTHER PUBLICATIONS http://docs.sun.com/source/816-6156-10/contents.htm, Introduction to SSL, Last Updated: Oct. 9, 1998.* Alteon SSL VPN, Nortel Networks, pp. 2-5, 2003.  
"Securing Communications on the Internet and over the Internet", Jul. 1996, XP002066298 NPL Database, pp. 5-7.  
"IP Security" Chapter 13, XP 002167283, pp. 399-440, 1999.  
Search Report dated Sep. 4, 2006.

* cited by examiner

*Primary Examiner* — Matthew B Smithers  
*Assistant Examiner* — Jing Sims  
(74) *Attorney, Agent, or Firm* — McDermott Will & Emery LLP

(57) ABSTRACT

In an encryption communication using VPN technologies, a load on a VPN system becomes large if the number of communication terminals increases. When an external terminal accesses via an internal terminal an application server, processes become complicated because it is necessary to perform authentication at VPN and authentication at the application server. A management server is provided for managing external terminals, internal terminals and application servers. The management server authenticates each communication terminal and operates to establish an encryption communication path between communication terminals. Authentication of each terminal by the management server relies upon a validation server. When the external terminal performs encryption communication with the application server via the internal terminal, two encryption communication paths are established and used between the external terminal and internal terminal and between the internal terminal and application server.

13 Claims, 17 Drawing Sheets

FIG.16

UTHENTICATION STATE TABLE 60

| TERMINAL ADDRESS (61) | TERMINAL IP ADDRESS (62) | AUTHENTICATION RESULT (63) | AUTHENTICATION TIME (64) |
|---|---|---|---|
| out1@aaa.bbb | 133.144.6.4 | OK | 2005/06/28 15:22:01 |
| out2@aaa.bbb | 172.24.36.5 | OK | 2005/06/29 12:20:45 |
| in1@aaa.bbb | 192.168.3.59 | OK | 2005/06/30 10:02:01 |
| ... | ... | ... | ... |

FIG.17

COMMUNICATION STATE TABLE 70

| COMMUNICATION SOURCE ADDRESS (71) | COMMUNICATION DESTINATION ADDRESS (72) | COMMUNICATION START TIME (73) |
|---|---|---|
| out1@aaa.bbb | in1@aaa.bbb | 2005/06/28 15:22:03 |
| out2@aaa.bbb | in2@aaa.bbb | 2005/06/29 12:20:48 |
| ... | ... | ... |

FIG.18

CONNECTION REQUEST 80 WITH
AUTHENTICATION OBJECT INFORMATION

| | | |
|---|---|---|
| 81 | COMMUNICATION SOURCE INFORMATION | INTERNAL COMMUNICATION TERMINAL (in1@aaa.bbb) |
| 82 | COMMUNICATION DESTINATION INFORMATION | AP SERVER (AP@aaa.bbb) |
| 83 | AUTHENTICATION OBJECT INFORMATION | EXTERNAL TERMINAL (out1@aaa.bbb) |
| 84 | OTHER COMMUNICATION INFORMATION AND APPLICATION INFORMATION | CANDIDATES FOR CLIENT COMMUNICATION INFORMATION, PROTOCOL, FORMAT, ETC |

SYSTEM AND METHOD FOR ENCRYPTED COMMUNICATION

INCORPORATION BY REFERENCE

This application claims priority based on Japanese patent applications, No. 2005-147488 filed on May 20, 2005 and No. 2006-096410 filed on Mar. 31, 2006, the entire contents of which are incorporated herein by reference.

BACKGROUND OF THE INVENTION

The present invention relates to techniques for encryption communication via a communication network such as the Internet.

Technologies of a Virtual Private Network (VPN) are utilized for proper accesses from household communication terminals to corporate information resources and for secure interconnections between local networks at corporate sites.

Description will be made, for example, on secure communication between an external communication terminal (hereinafter called an external terminal where appropriate) coupled to an external network such as the Internet and an internal communication terminal (hereinafter called an internal terminal where appropriate) coupled to an intra-organization network such as a corporate network.

First, the external communication terminal transmits a connection request for the internal communication terminal to a VPN apparatus at an input port of the intra-organization network from the Internet. The VPN apparatus authenticates the external communication terminal by using a public key certificate (hereinafter described as "certificate") or the like to thereby confirm that the external communication terminal can access the internal communication terminal. The external communication terminal authenticates the VPN apparatus by using a certificate or the like.

After the external communication terminal and VPN apparatus authenticate mutually, an encryption key is shared by the external communication terminal and VPN apparatus to encrypt data to be transferred between the external communication terminal and VPN apparatus by using the encryption key. The VPN apparatus is coupled to the internal communication terminal to relay data requested by the external communication terminal.

In this manner, the external communication terminal can communicate with the internal communication terminal via the VPN apparatus. Data to be transferred between the external communication terminal and VPN apparatus is encrypted, so that secure communication is possible.

Functional description of an apparatus supplying VPN technologies is disclosed, for example, NORTEL NETWORKS, "Alteon SSL VPN"., NORTEL NETWORKS, PP. 2 to 3, <http://www.nortel.com/products/01/alteon/sslvpn/collateral/nn102960-073103.pdf>

SUMMARY OF THE INVENTION

With a conventional secure communication method using VPN technologies, there is a fear that a load of the VPN apparatus becomes large because all data to be exchanged is transmitted/received via the VPN apparatus.

For example, if there exist a plurality of external communication terminals and internal communication terminals and a number of secure communications are performed among communication terminals, the VPN apparatus performs an authentication process for a plurality of external communication terminals and an encryption process for all data exchanged among communication terminals. There arises therefore a problem of a large load of the VPN apparatus.

Further, there is another problem. If an application server (hereinafter described as an AP server where appropriate) is coupled providing an intra-organization network with business applications, databases and the like, a plurality of authentication processes are necessary when an external communication terminal accesses the application server via the internal communication terminal.

For example, in the case in which an external communication terminal coupled to the Internet operates through a remote access to an internal communication terminal coupled to a corporate network, if services of an application server are to be used from the internal communication terminal, in addition to the authentication process by the VPN apparatus, an authentication process by an application server is required, for example, a user ID, a password or the like are required to be input. There is a fear of cumbersome management of passwords.

Furthermore, conventional VPN technologies do not consider encrypted communications between a VPN apparatus and an internal communication terminal and between an internal communication terminal and an AP server. If the whole communication path between an external communication terminal and the AP server is to be encrypted in order to retain security, there arises a problem that this encryption process becomes complicated.

The present invention has been made under the above-described circumstances, and provides techniques of distributing loads in secure communications and encrypting the whole communication path, and/or techniques of simplifying authentication and ensuring further security in accessing from an external communication terminal to an intra-organization communication terminal such as an application sever via an internal communication terminal.

In order to realize this, the present invention provides a communication system having a management server for managing external communication terminals, internal communication terminals and application servers.

According to the communication system of the present invention, secure communication is performed between an external communication terminal and an internal communication terminal by executing the following steps. Description will be made also on the steps of performing secure communication between an external communication terminal and an application server via an internal communication terminal.

First, description will be made on starting security communication of the external communication terminal with the internal communication terminal.

The external communication terminal accesses the management server coupled to the input port of the intra-organization network, and the external communication terminal and management server mutually authenticate. If strict authentication is required, authentication is made by using a public key certificate.

If mutual authentication succeeds, an encryption key is shared for encrypting data to be exchanged between the external communication terminal and management server, and an encryption communication path between the external communication terminal and management server is established.

Similar processes to those described above are executed between the internal communication terminal and management server to establish the encryption communication path between the internal communication terminal and management server.

After the encryption communication path to the management server is established, the external communication terminal sends a connection request for the internal communication terminal to the management server. The management server confirms that both the external communication terminal and internal communication terminal have already been authenticated, and generates an encryption key and setting information to be used for communications between the external communication terminal and internal communication terminal. Then, the connection request for the internal communication terminal and the encryption key and setting information are sent from the external communication terminal via the encryption communication path established to the internal communication terminal.

The internal communication terminal judges whether the external communication terminal can be coupled to the internal communication terminal, and sends a judgment result to the management server.

If the external communication terminal and internal communication terminal can be mutually coupled, the management server sends a message indicating a connection permission and the encryption key and setting information to be used for encryption communication between the external communication terminal and internal communication terminal, to the external communication terminal.

The setting information is any combination of one or more pieces of the information necessary for encryption communications such as the type of algorithm of the encryption key, a key length, an IP address and a port number.

By using the encryption key and setting information, an encryption communication path is established between the external communication terminal and internal communication terminal to perform secure communication. In the present invention, sharing the key capable of mutual encryption communication by two communication apparatus is assumed to be that the encryption communication path has been established.

Next, description will be made on two methods by which the external communication terminal accesses an application server via the internal communication terminal. For example, when the external communication terminal remotely accesses the internal communication terminal and uses the application server from the internal communication terminal, secure communication is performed by using one of the following two methods.

The first method will be described. First, by using the above-described method, an encryption communication path is established between the external communication terminal and internal communication terminal without involving the management server. The external communication terminal transmits key input information indicating a connection request instruction for the application server to the internal communication terminal by using the established encryption communication path.

In response to the operation of the external communication terminal, the internal communication terminal executes a step similar to that described above to establish an encryption communication path to the application server. Namely, the internal communication terminal and application server establish encryption communication paths to the management server. In this case, it is assumed that the application server establishes beforehand the encryption communication path to the management server. If the internal communication terminal has already established the encryption communication path to the management server, it is not necessary to establish again the encryption communication path.

After the encryption communication paths are established, the internal communication terminal sends a connection request for the application server to the management server. The management server checks whether the application server has been already authenticated and the encryption communication path to the application server has been already established. If not, authentication and/or encryption communication path establishment is performed by the processes similar to those for the internal communication terminal, and generates the encryption key and setting information to be used for encryption communications between the internal communication terminal and application server. Then, the connection request received from the internal communication terminal, and the encryption key and setting information are sent to the application server via the encryption communication path established to the application server.

The application server judges whether the internal communication terminal can be coupled to the application server, and sends a judgment result to the management server.

If the judgment result indicates a connection permission, the management server sends a message indicating a connection permission and an encryption key and setting information to be used for encryption communication between the internal communication terminal and application server without involving the management server to the internal communication terminal.

By using the encryption key and setting information, the application server and internal communication terminal establish an encryption communication path without involving the management server.

When the external communication terminal accesses the application server via the internal communication terminal, secure communication is performed by using the two established encryption communication paths (between the external communication terminal and internal communication terminal and between the internal communication terminal and application server).

Next, the second method will be described. In the second method, an external terminal, which is not an authentication object when the application server is accessed in the first embodiment, becomes a new authentication object.

First, the encryption communication path without involving the management server is established between the external communication terminal and internal communication terminal by the method similar to the first method. The external communication terminal transmits key input information indicating a connection request instruction for the application server via the internal communication terminal to the internal communication terminal by using the established encryption communication path.

In response to this, the internal communication terminal executes the following step to establish an encryption communication path to the application server.

The internal communication terminal and application server establish encryption communication paths to the management server. In this case, it is assumed that the application server establishes beforehand the encryption communication path to the management server. If the internal communication terminal has already established the encryption communication path to the management server, it is not necessary to establish again the encryption communication path.

After the encryption communication paths are established, the internal communication terminal sends a connection request for the application server to the management server, on the basis of the operation of the external communication terminal. The connection request to be sent in this case is written with that a connection request source for the application server is the external communication terminal. After receiving the connection request, the management server confirms that the external communication terminal, internal communication terminal and application server have been already authenticated and that the external communication terminal is being under encryption communication with the internal communication terminal. If the confirmation is made, the management server generates the encryption key and setting information for be used for communications between the internal communication terminal and application server. Then, the connection request from the external communication terminal to the application server via the internal communication terminal received from the internal communication terminal.

The application server judges whether the external communication terminal can access the application server via the internal communication terminal, and sends a judgment result to the management server.

If the judgment result indicates a connection permission, i.e., if the application server can authenticate both the external communication terminal and internal communication terminal, the management server sends a message indicating a connection permission the encryption key and setting information to be used for encryption communication between the internal communication terminal and application server without involving the management server, to the internal communication terminal.

By using the encryption key, the application server and internal communication terminal establish an encryption communication path without involving the management server.

When the external communication terminal accesses the application server via the internal communication terminal, secure communication is performed by using the two established encryption communication paths (between the external communication terminal and internal communication terminal and between the internal communication terminal and application server).

The internal communication terminal and application server may not perform beforehand authentication with the management server and establishment of the encryption communication paths, but these authentication and establishment may be performed in response to a connection request from the external communication terminal. For example, for an application server frequently receiving connection requests from a plurality of communication terminals, the encryption communication path to the management server may be established beforehand, and when the connection request for the application server is issued from the internal communication terminal to the management server, this connection request is processed immediately. For an application server receiving quite a few connection requests from a specific external terminal, authentication with the management server may be performed at the timing of the connection request to establish the encryption communication path.

The communication path between the internal communication terminal and application server may not be encrypted if it is not necessary.

Further, when the management server authenticates the external communication terminal, internal communication terminal and application server, authentication of a certificate may be requested to a certificate validation server apparatus (hereinafter described as a validation server) for validating the certificate. More reliable authentication can be realized by validation of the certificate by the validation server.

The management server may be operated by a third organization. Namely, the management server may be coupled to another intra-organization network different from that of internal communication terminals.

According to the above-described configuration, after the encryption communication paths are established between the external communication terminal and internal communication terminal and between the internal communication terminal and application server, encryption communication without involving the management server is possible. The load of the management server can therefore be mitigated more than conventional techniques. Furthermore, since the whole communication path can be encrypted, communications securer than conventional techniques become possible.

Further, according to the present invention, when the external communication terminal accesses the application server via the internal communication terminal and if the management server can authenticate the external communication terminal, internal communication terminal and application server, the application server can be accessed by the operation of the external communication terminal in accordance with the authentication result. It is not necessary to additionally perform authentication specific to the application server such as authentication of an ID, a password and the like. Namely, the management server can collectively authenticate the communication terminals such as external communication terminals, internal communication terminals and application servers, so that each communication terminal is not required to execute a plurality of authentication processes. Authentication can therefore be simplified.

Strict authentication on the PKI base is possible for authentication by the management server.

According to the present invention, a load of the management server is reduced during encryption communication between the external communication terminal and internal communication terminal and between the internal communication terminal and application server. Securer communications become possible in the whole communication path from the external communication terminal to the application server.

Further, according to the present invention, when the external communication terminal accesses the application server via the internal communication terminal, it is not necessary for the application server to authenticate the external communication terminal, i.e., it is possible to simplify the authentication process.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 16 is a diagram exemplifying the contents of an authentication state table held by the management server according to the second embodiment.

FIG. 17 is a diagram exemplifying the contents of a communication state table held by the management server according to the second embodiment.

FIG. 18 is a diagram exemplifying the contents of a connection request from the external terminal 11 to the AP server 14 via the internal terminal 15, when the external terminal 11 is coupled to the AP server 14 via the internal terminal 15, according to the second embodiment.

DESCRIPTION OF THE EMBODIMENTS

In the following, two embodiments of the present invention will be described.

An ID, an address, a domain name and the like used in the following embodiments are imaginary terms used for description. Even if these terms actually exist, there is no actual relation therebetween.

First Embodiment

Figure 1:
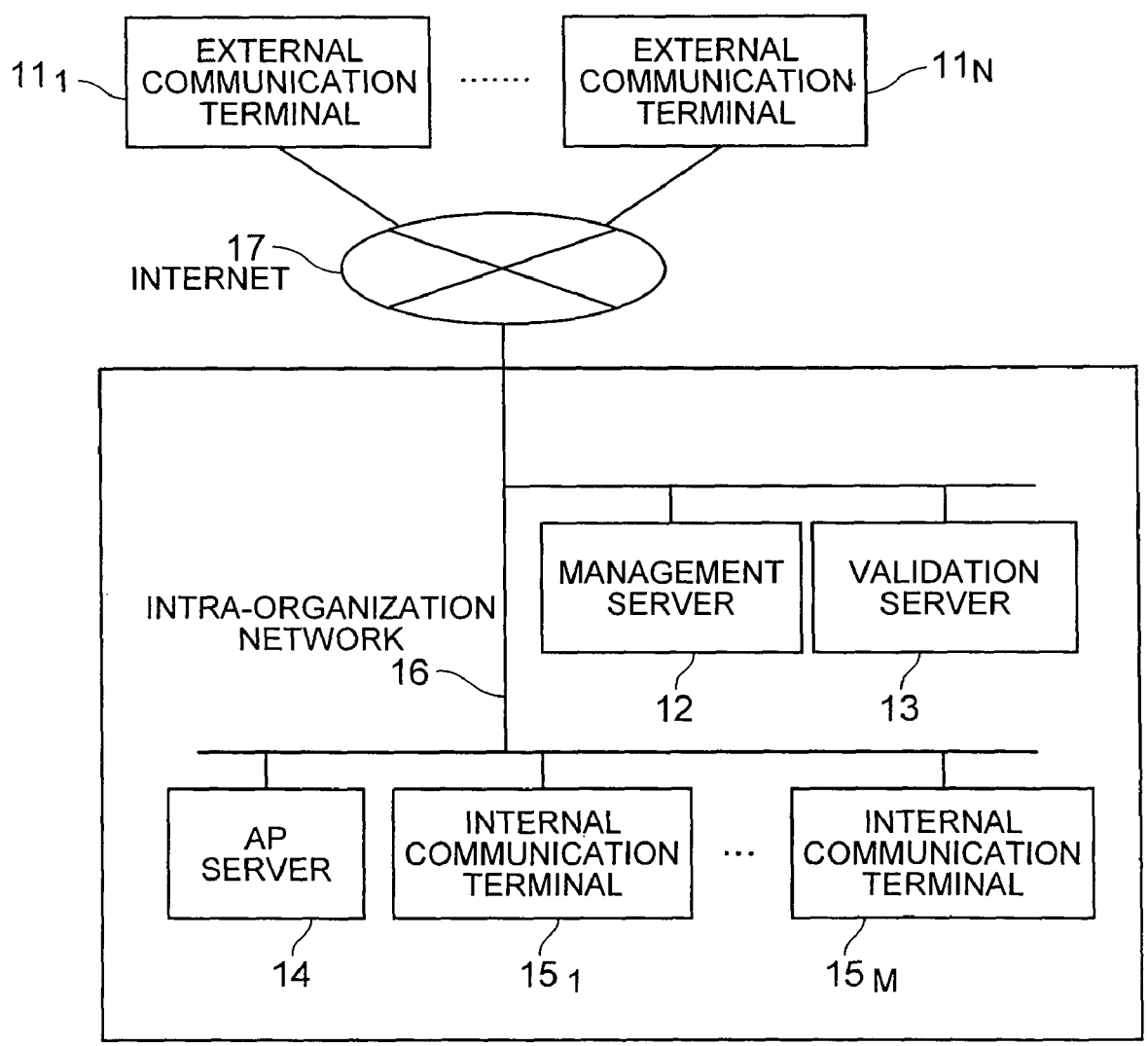
FIG. 1 is a diagram exemplifying a communication system according to two embodiments of the present invention.

FIG. 1 is a diagram exemplifying the structure of a communication system according to an embodiment of the present invention.

The communication system of the embodiment is constituted of an external network such as the Internet (the external network is called the Internet) 17, external communication terminals $11_1$ to $11_N$ (collectively called "external terminals 11") coupled to the Internet 17, and an intra-organization network 16 coupled to the Internet 17. Although not shown, the Internet 17 and intra-organization network 16 may be coupled via apparatus called firewalls for preventing unauthorized communication. In this case, setting is effected in such a manner that communication between the external terminal 11 and a management server 12 is not intercepted by firewalls. Each network may be either a wired network or a wireless network.

Coupled to the intra-organization network 16 are an AP server 14 for providing business applications, databases and the like to users in the organization, internal communication terminals $15_1$ to $15_M$ (collectively called "internal terminals 15") storing data to be used by users in the organization, the management server 12 for managing communication between communication terminals, and a validation server 13 for validating a certificate for communication terminal authentication. The management server 12 and/or validation server 13 may be managed by an organization different from the internal terminals 15 and AP server 14, and coupled to another intra-organization network.

Next, each apparatus constituting the communication system shown in FIG. 1 will be described.

First, with reference to FIG. 1, description will be made on the external terminal 11, internal terminal 15 and AP server 14. In the following description, if these apparatus are not to be distinguished from each other, these apparatus including the AP server 14 are simply called a "communication terminal" or "terminal".

The communication terminal has a processing unit 20a, a storage unit 20b, an input/output unit 20c for communication result display and user instruction reception, and a communication unit 20d for communication with another apparatus via the Internet 17 and intra-organization network 16.

The processing unit 20a has: an address registration request unit 21 for registering an address for identifying a location of the communication terminal on the network; a management server communication processing unit 22 for executing a process of communicating with the management server 12; a terminal communication processing unit 23 for executing a process of communicating with a partner communication terminal; and a control unit 24 for collectively controlling each part of the communication terminal.

The storage unit 20b has a secret key certificate holding unit 25 for holding a secret key and a public key certificate of the communication terminal to be used for the management server 12 to authenticate the communication terminal, and an encryption key holding unit 26 to be used for communication encryption.

Next, the management server 12 will be described with reference to FIG. 3.

The management server 12 has a processing unit 30a, a storage unit 30b, an input/output unit 30c for communication result display and user instruction reception, and a communication unit 30d for communication with another apparatus or another apparatus coupled via the Internet 17, via the intra-organization network 16.

The processing unit 30a has: an address registration/search unit 31 for receiving an address registration request from a communication terminal and registering an address in an address DB 37, and for searching an address of a communication terminal, a key generation/distribution unit 32 for generating an encryption key for encryption of communication between communication terminals and distributing the encryption key to a communication terminal, a terminal communication processing unit 33 for executing a process of communicating with a communication terminal, a validation server communication processing unit 34 for executing a process of communicating with the validation server 13, and a control unit 35 for collectively controlling each part of the management server 12.

The storage unit 30b has a secret key-certificate holding unit 36 for holding a secret key and a public key certificate of the management server 12 to be used for the management server 12 to authenticate a communication terminal, and the address DB 37 for holding addresses of communication terminals.

Next, the validation server 13 will be described with reference to FIG. 4.

The validation server 13 has a processing unit 40a, a storage unit 40b, an input/output unit 40c for communication result display and user instruction reception, and a communication unit 40d for communication with another apparatus or another apparatus coupled via the Internet 17, via the intra-organization network 16.

The processing unit 40a has: an certification path search unit 41 for searching, in response to a validation request received from the management server 12, an certification path indicating a credit relation between the certificate of an certification authority relied by the management server and the certificate of the communication terminal to be validated, an certification path validation unit 42 for authenticating the certification path searched by the certification path search unit 41, a management server communication processing unit 43 for executing a process of communicating with the management server 12 and a control unit 44 for collectively controlling each part of the validation server 13.

The storage unit 40b has a certificate holding unit 45 for holding a certificate acquired from an certification authority and invalidation information to be used for the certification path search unit 41 to search the certification path.

Figure 2:
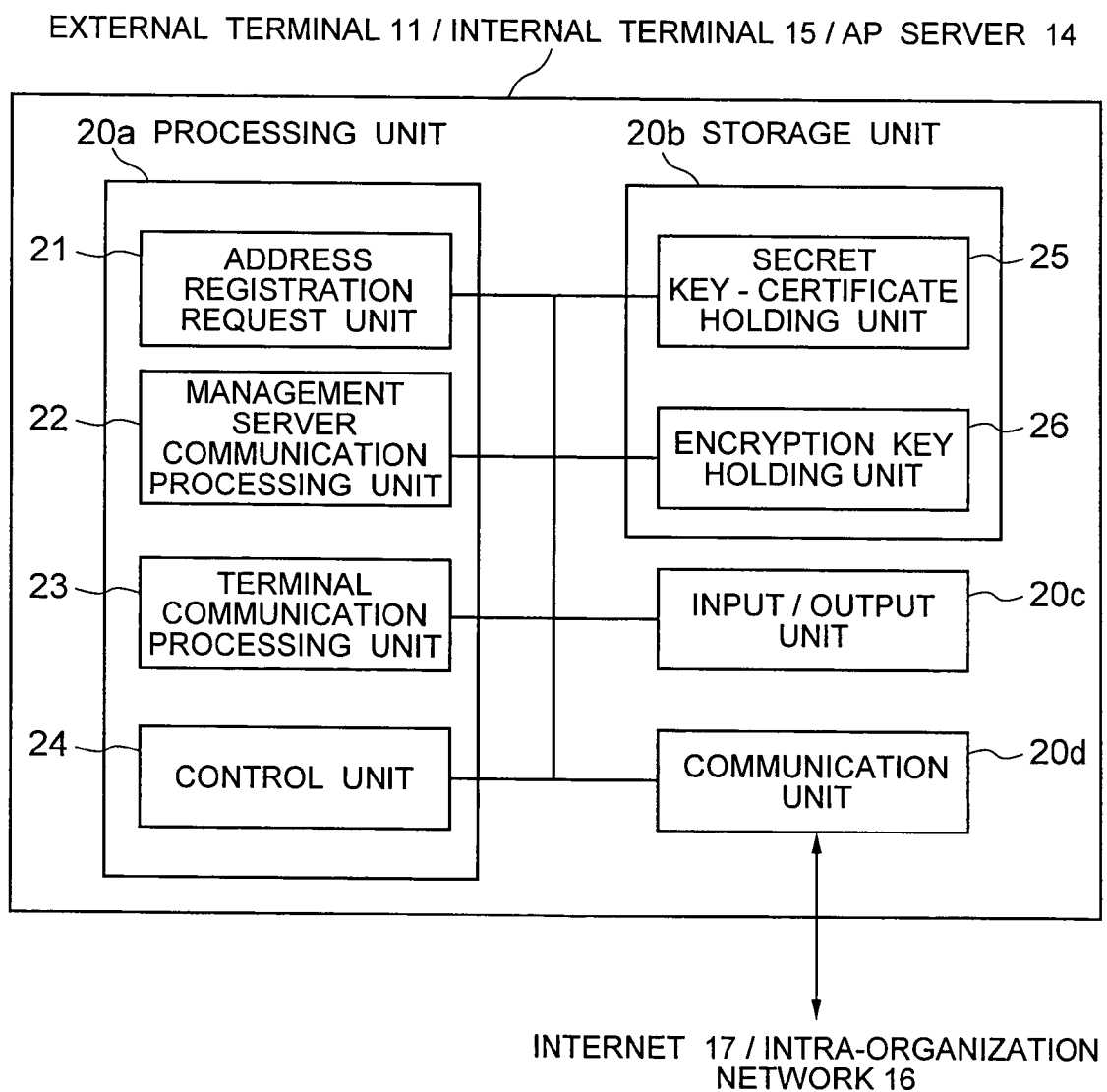
FIG. 2 is a diagram exemplifying the outline structure of an external terminal 11, an internal terminal 15 and an AP server 14.
Figure 3:
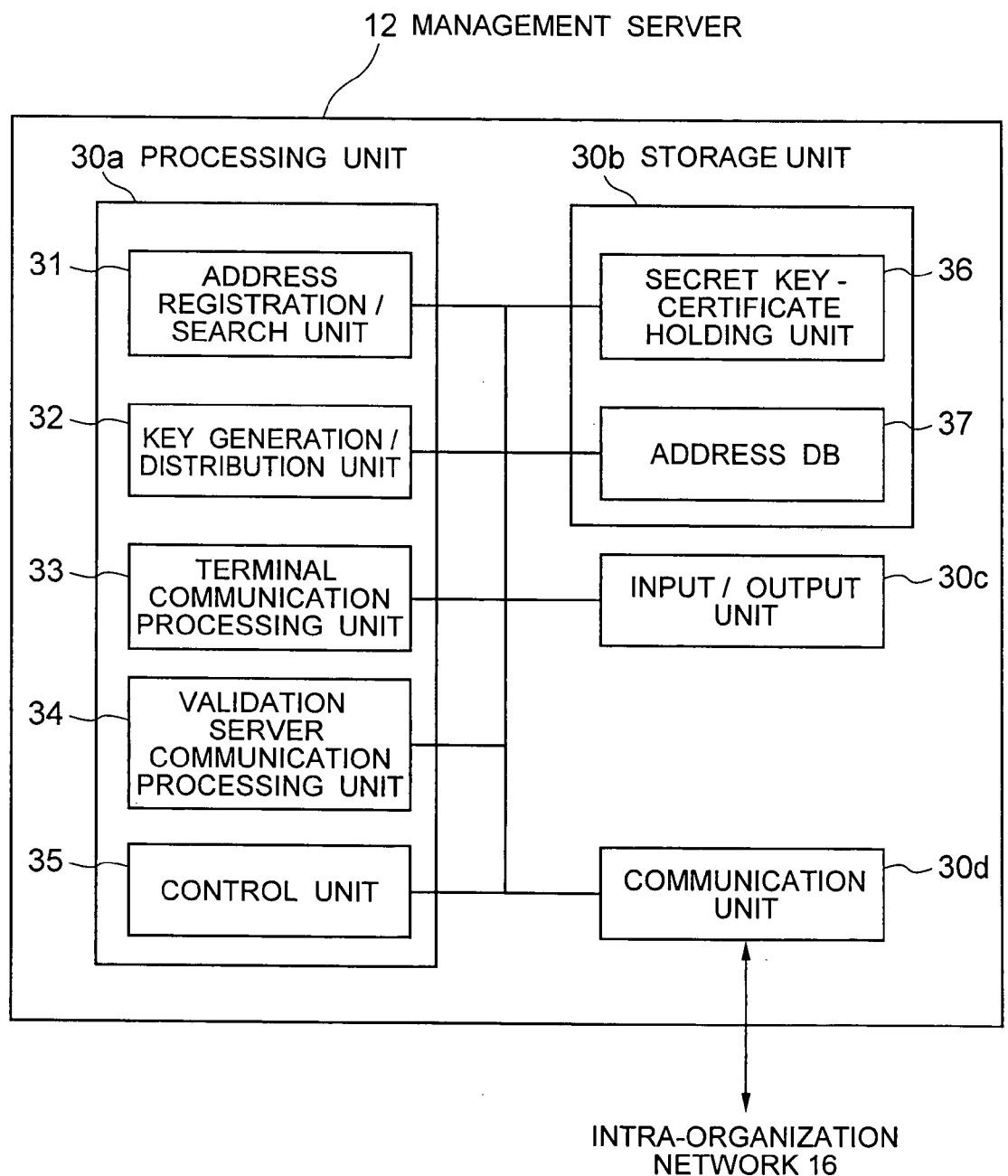
FIG. 3 is a diagram exemplifying an outline structure of a management server 12.
Figure 4:
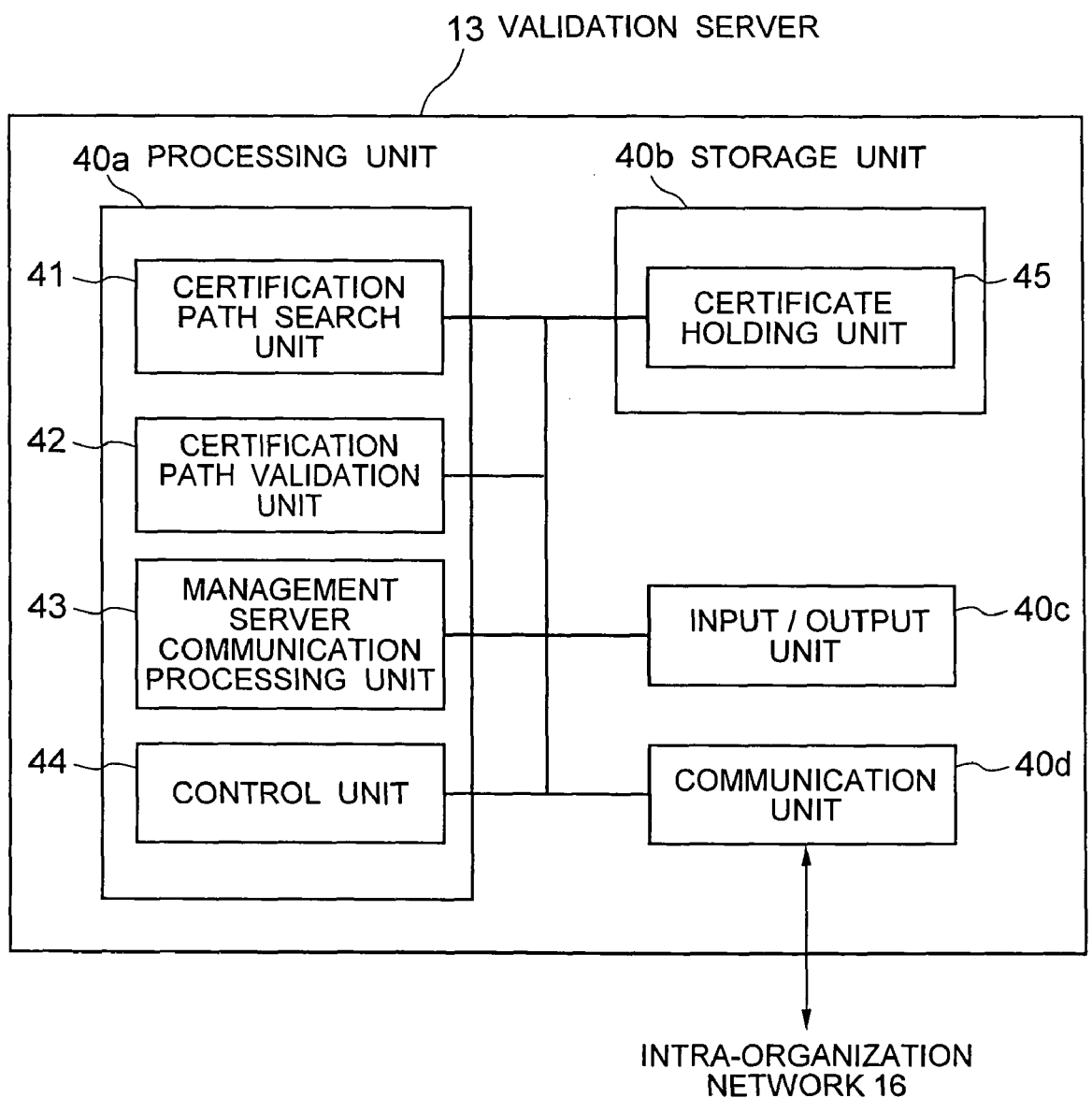
FIG. 4 is a diagram exemplifying an outline structure of a validation server 13.

The processing unit of the communication terminal, management server 12 and validation server 13 illustrated in FIGS. 2 to 4 can be realized by making a CPU 51 of a general computer execute predetermined programs loaded in a memory 52. The computer has, for example, as illustratively shown in FIG. 5, CPU 51, memory 52, an external storage device 53 such as a hard disc, a communication device 54 for communicating with another apparatus via the Internet 17 and intra-organization network 16, an input device 55 such as a keyboard and a mouse, an output device 56 such as a display device and a printer, a reader 57 for reading information from a portable storage medium 58 and an internal communication line 50 coupling these devices.

The programs may be stored in the memory 52 or external storage device 53 of the computer, or may be supplied, when necessary, from the portable storage medium 58 usable by the computer, or from another apparatus via communication media (such as the Internet 17 and intra-organization network 16, or carriers and digital signals transmitting over the networks).

Figure 5:
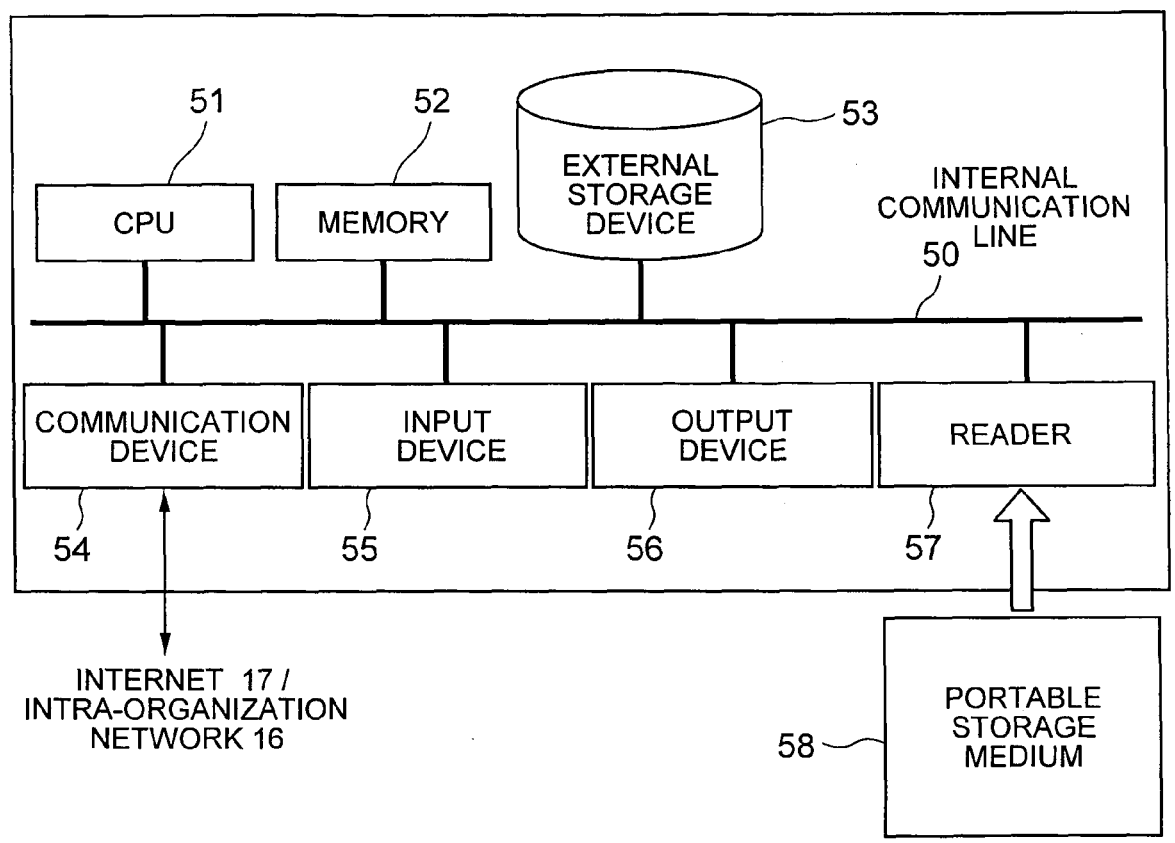
FIG. 5 is a diagram exemplifying an example of the hardware structure of the external terminal 11, internal terminal 15, AP server 14, management server 12 and validation server 13.

In this embodiment, although the communication terminal can be realized by the structure shown in FIG. 5, the present invention is not limited thereto. The communication terminal illustratively shown in FIG. 2 may be any apparatus provided with a function corresponding to that of the communication device 54 capable of being coupled to the Internet 17 and intra-organization network 16. For example, not only a router, a PC and a PDA, but also electrical home appliances such as a television, a refrigerator and an microwave oven may be used as the communication terminal if the similar structure to that shown in FIG. 5 is provided.

The processing unit may be structured as hardware.

Next, the operation of the communication system of the embodiment will be described.

The operation of the communication system of the embodiment includes an encryption communication path establishing operation between the communication terminal and management server and an encryption communication path establishing operation between the communication terminals.

Figure 6:
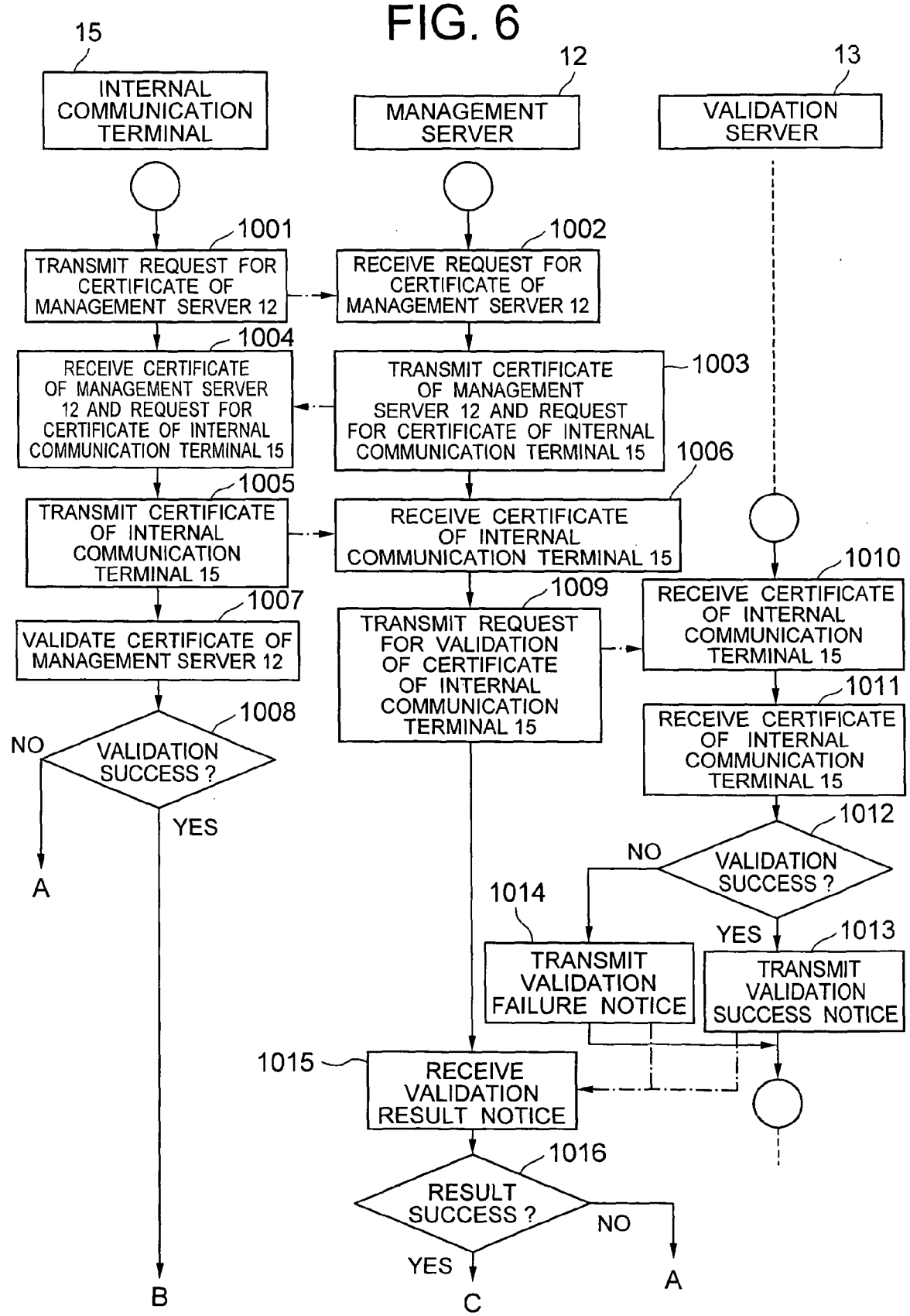
FIG. 6 is a flow chart illustrating a process sequence by which the external terminal 11 and management server 12 are mutually authenticated in order to establish an encryption communication path between the external terminal and management server.
Figure 7:
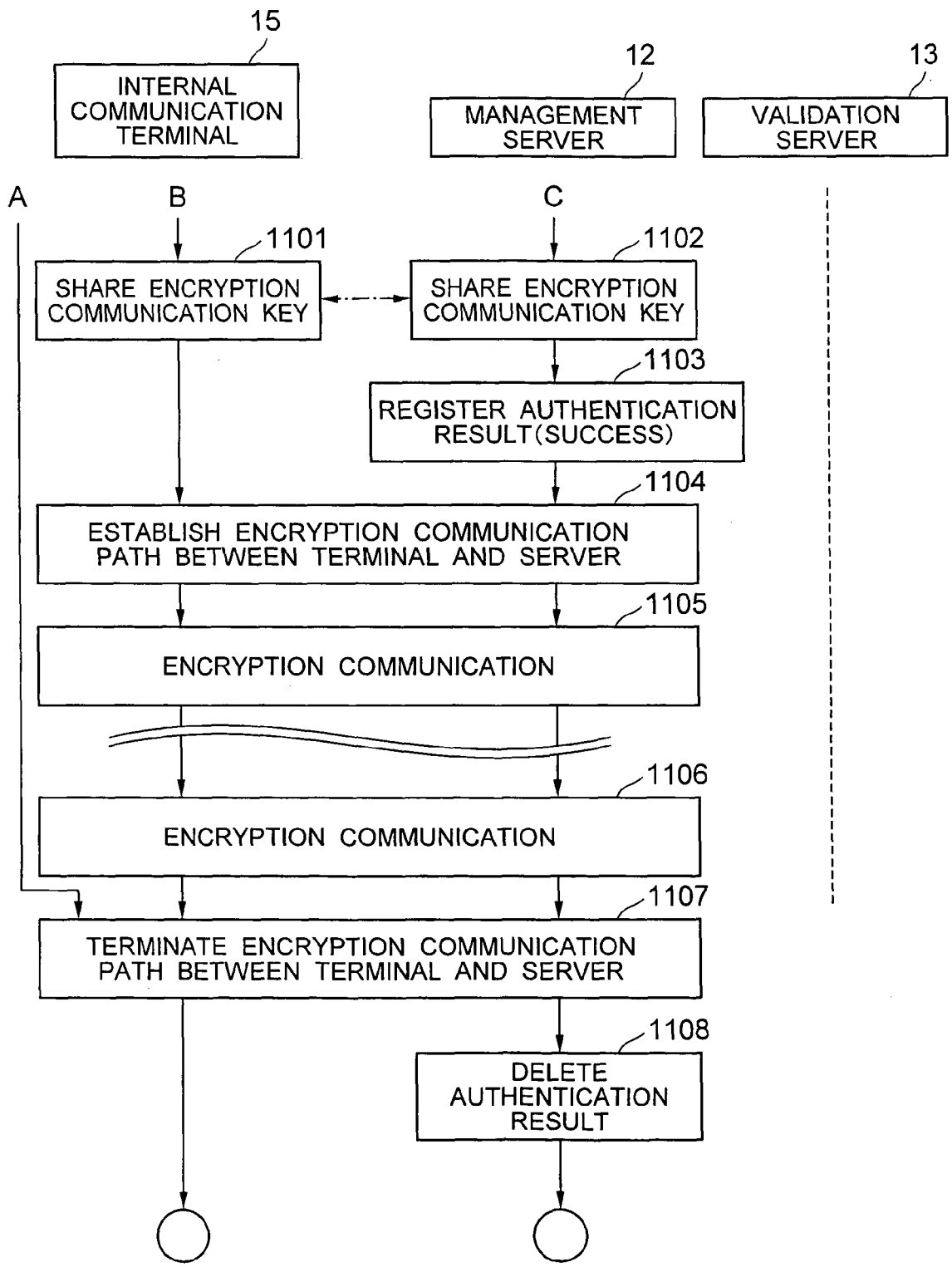
FIG. 7 is a flow chart illustrating a process sequence by which the external terminal 11 and management server 12 establish the encryption communication path between the external terminal and management server and terminate the path.

FIGS. 6 and 7 are flow charts illustrating the encryption communication path establishing operation between the communication terminal and management server according to an embodiment, in which an encryption communication path (encryption communication path between an internal terminal and management server) is established between the internal terminal 15 and management server 12.

The management server communication processing unit 22 of the internal terminal 15 transmits a request for a certificate of the management server 12, to the management server 12, to authenticate the management server 12 (Step 1001 in FIG. 6). After receiving this request (Step 1002), the terminal communication processing unit 33 of the management server 12 extracts the certificate of the management server from the secret key-certificate holding unit 26 and sends the certificate and a certificate request for the partner internal terminal 15, to the partner internal terminal 15 (Step 1003). After receiving the certificate request (Step 1004), the management server communication processing unit 22 of the internal terminal 15 extracts a certificate of the internal terminal 15 from the secret key-certificate holding unit 36, and sends the certificate to the management server 12 (Step 1005).

The management server communication processing unit 22 of the internal terminal 15 validates the certificate of the management server 12 received at Step 1004 to check whether the management server 12 makes identity theft. If validation of the certificate of the management server 12 fails (No at Step 1008), communication is terminated because the management server cannot be certificated (Step 1107). If validation of the certificate of the management server 12 succeeds (Yes at Step 1008), the flow advances to next Step.

The terminal communication processing unit 33 of the management server 12 receives the certificate from the internal terminal 15 (Step 1006), and in order to validate the certificate, sends a request for validation of the certificate of the internal terminal 15 to the validation server 13 via the validation server communication processing unit 34 (Step S009).

The certificate validation server 13 receives the validation request (Step 1010), the certification path search unit 41 executes a validation path search process, and the certification path validation unit 42 validates the searched certification path (Step 1011). If validation of the certificate of the internal terminal 15 succeeds (Yes at Step 1012), the management server communication processing unit 43 of the validation server 13 sends a notice indicating a success of certificate validation to the management server 12 (Step 1013). If validation of the certificate of the internal terminal 15 fails (No at Step 1012), the management server communication processing unit 43 sends a notice indicating a fail of certificate validation to the management server 12 (Step 1014).

The terminal communication processing unit 33 of the management server 12 receives a validation result from the validation server 13 via the validation server communication processing unit 34 (Step 1015), and if the validation result fails (No at Step 1016), communication is terminated (Step 1107 in FIG. 7) because the internal terminal cannot be authenticated. If validation result of the certificate of the internal terminal 15 succeeds (Yes at Step 1016), the flow advances to next Step.

If both the internal terminal 15 and management server 12 can be mutually authenticated (Yes at Step 1008 and Yes at Step 1016), the management server communication unit 22 of the internal terminal 15 and the terminal communication processing unit 33 of the management server 12 share a secret key for communication path encryption (Steps 1101 and 1102 in FIG. 7). As a method of sharing a secret key, for example, Transport Layer Security (TLS) standardized by IETF as RFC 2246 may be used. As the secret key is shared, authentication and an encryption communication path can be established between the internal terminal 15 and management server 12. Therefore, the address registration/search unit 31 of the management server 12 registers a correspondence between an IP address of the internal communication terminal 15 and the authentication result (in this case, a success of authentication) in an authentication state table 60 shown in FIG. 16 (Step 1103). More specifically, the IP address of the internal communication terminal 15 is registered in an IP address 62, and a message indicating an authentication success and its time are registered in an authentication result 63 and an authentication time 64, respectively. This authentication state table 60 is used for managing the states of communication terminals to be communicated with the management server 12, and is held in the address DB 37 of the management server 12.

With these processes, the encryption communication path establishing process is completed between the internal communication terminal 15 and management server 12 (Step 1104), and the management server communication processing unit 22 of the internal terminal 15 and the terminal communication processing unit 33 of the management server 12 perform encryption communication by using the secret key (Steps 1105 and 1106).

After the encryption communication, the management server communication processing unit 22 of the internal terminal 15 and the terminal communication processing unit 33 of the management server 12 release the encryption communication path (Step 1107). The encryption communication path can be released, for example, by invalidating the encryption key to be used for encryption communication.

The address registration/search unit 31 of the management server 12 deletes the IP address and authentication result of the internal communication terminal 15 registered at Step 1103, from the authentication state table 60 held in the address DB 37. If an IP address of the internal terminal 15 is to be registered fixedly in the authentication state table 60, the IP address of the communication terminal is not required to be deleted.

By executing these Steps, the internal terminal 15 and management server 12 can establish an encryption communication path, by mutually confirming both parties.

Next, description will be described on the encryption communication path establishing operation between communication terminals.

Figure 8:
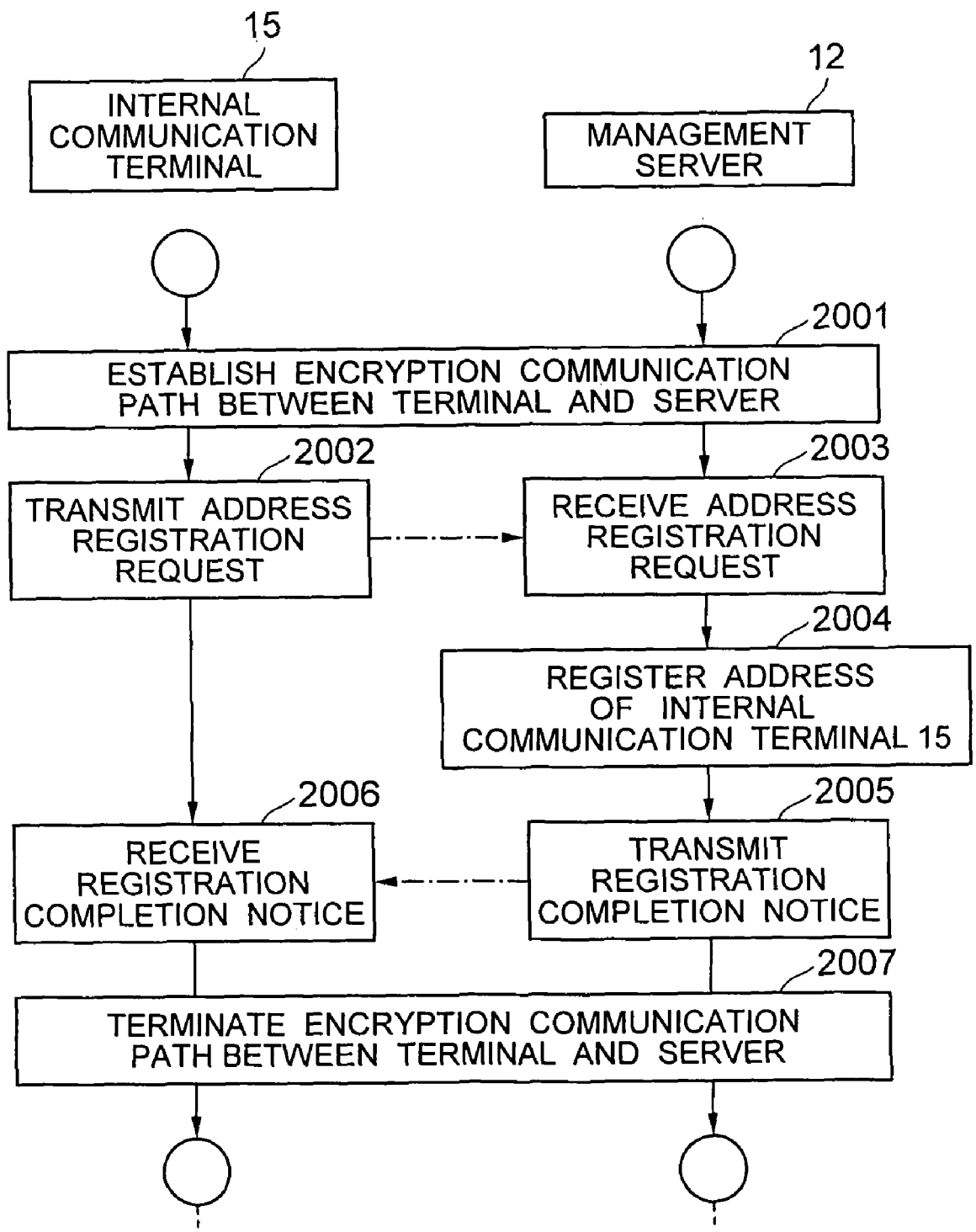
FIG. 8 is a flow chart illustrating a process sequence by which the internal terminal 15 registers its address in the management server 12.

In order to establish the encryption communication path between communication terminals, it is necessary to register in advance address information on communication terminals in the management server 12. The address information is information indicating a correspondence between information (hereinafter called terminal ID) identifying a communication terminal and an address (e.g., IP address) identifying a location on the network. An ID fixed in a domain may be used as the terminal ID. The fixed ID means an ID which can identify the terminal in the domain and does not change. For example, in a case of a portable terminal, the IP address may change with a network connection location. The terminal ID may be other information not changed, e.g., a communication terminal name, a MAC address of the communication terminal. In a closed domain such as a corporation, the terminal ID may be a mail address of a user of the communication terminal, a SIP-URI of the communication terminal, FQDN (Fully Qualified Domain Name) of the communication terminal or the like. With reference to FIG. 8, description will be made on an address registration operation.

FIG. 8 is a flow chart illustrating an operation to be executed by the internal communication terminal 15 to register an address of the communication terminal in the management server 12.

First, the internal terminal 15 and management server 12 execute Steps 1001 to 1016 shown in FIG. 6 and Steps 1101 to 1104 shown in FIG. 7 to establish the encryption communication path between the internal terminal and management server (Step 2001). After the encryption communication path between the internal terminal and management server is established, the address registration request unit 21 of the internal terminal 15 sends a registration request for the address of the internal terminal 15 to the management server 12 (Step 2002). After receiving the registration request (Step 2003), the address registration/search unit 31 of the management server 12 registers a correspondence between the terminal ID and IP address of the internal terminal 15 in the authentication state table 60 held in the address DB 37 (Step 2004). More specifically, the IP address of the internal terminal 15 is searched from the IP address 62 of the authentication state table 60, and the terminal ID of the internal terminal is registered in the terminal address 61 in correspondence with the searched IP address. If the IP address of the internal terminal cannot be detected from the authentication state table 60, the terminal ID and IP address of the internal terminal 15 are newly registered in the terminal address 61 and terminal IP address 62. After the registration is completed, a registration completion notice is sent to the internal terminal 15 (Step 2005). After receiving the registration completion notice at the internal terminal 15 (Step 2006), the internal terminal 15 and management server 12 execute a process of releasing the encryption communication path between the internal terminal and management server. By executing the above-described Steps, an address of the internal terminal 15 can be registered in the management server 12.

Another communication terminal, e.g., the external terminal 11 can register the address of the external terminal 11 in the management server 12, by executing similar Steps to those shown in FIG. 8.

The communication terminal can also delete the address registered in the management server 12. In deleting the address, in the processes shown in FIG. 8, processes replacing (alternatively reading) "register" with "delete" are executed.

If the address assigned to the communication terminal is changed, it is necessary to execute again the address registration process shown in FIG. 8. For example, if the communication terminal is dynamically assigned an address, the address may be changed when the power source of the communication terminal is turned on or off or the communication terminal is reset. Also, the address may be changed when the communication terminal terminates a connection to the network and thereafter is coupled to another network. In such a case, the communication terminal executes again the registration process shown in FIG. 8 to register the newest address in the management server 12.

If the IP address of the communication terminal and terminal ID are fixedly set, the address of the communication terminal is registered in advance. In this case, it is not necessary to delete the address information.

Figure 9:
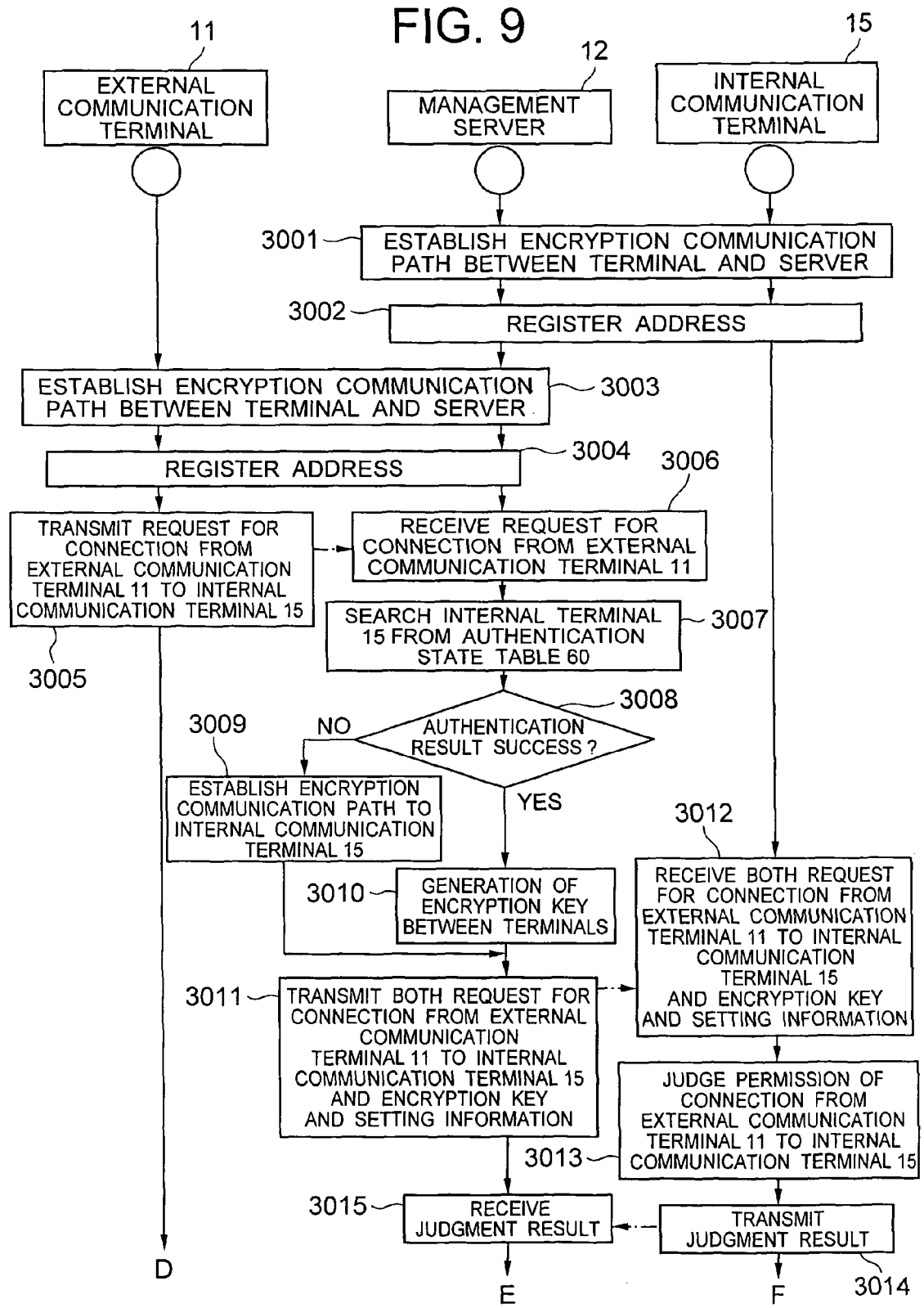
FIG. 9 is a flow chart illustrating a process sequence by which the management server 12 issues a connection request to the internal terminal 15 when the external terminal 11 executes a connection process for the internal terminal 15.
Figure 10:
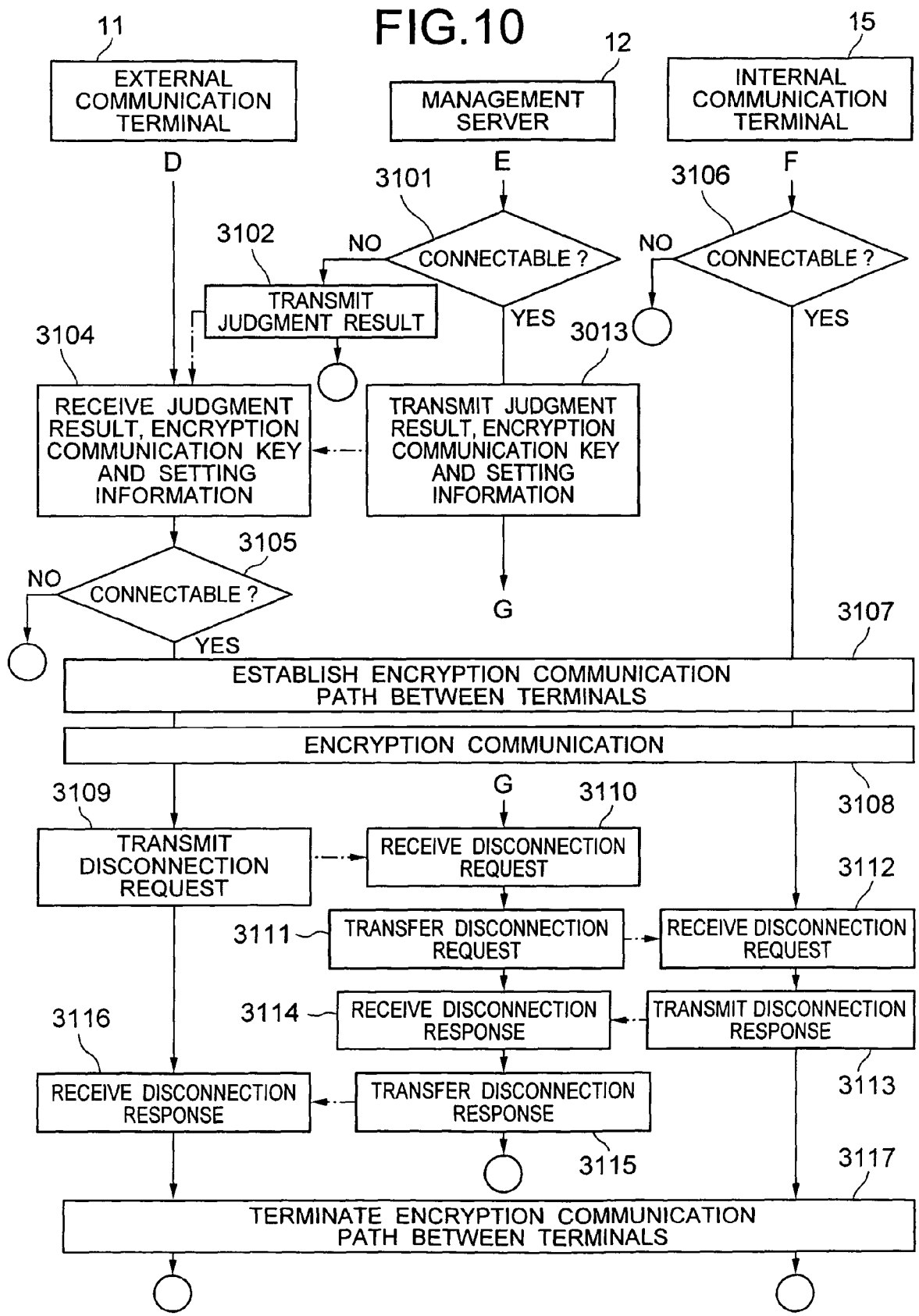
FIG. 10 is a flow chart illustrating a process sequence by which an encryption communication path between the external terminal 11 and internal terminal 15 is established and terminated, when the external terminal 11 executes a connection process for the internal terminal 15.

FIGS. 9 and 10 are flow charts illustrating an operation of establishing an encryption communication path between communication terminals without involving the management server, in which the encryption communication path (called encryption communication path between terminals) is established between the external terminal 11 and internal terminal 15.

First, the internal terminal 15 and management server 12 execute Steps 1001 to 1016 shown in FIG. 6 and Steps 1101 to 1104 shown in FIG. 7 to establish the encryption communication path between the internal terminal and management server (Step 3001). If the internal terminal 15 does not yet register its address, Steps 2002 to 2006 shown in FIG. 8 are executed to register the address of the internal terminal 15 in the management server 12 (Step 3002).

At the timing when the external terminal 11 starts communicating with the internal terminal 15 or at another timing, the external terminal 11 and management server 12 execute Steps 100a to 1016 shown in FIG. 6 and Steps 1101 to 1104 shown in FIG. 7 to establish the encryption communication path between the external terminal and management server (Step 3003). If the external server 11 does not still register its address or if the registered address is required to be updated, Steps 2002 to 2006 shown in FIG. 8 are executed to register the address of the external terminal to the management server 12 (Step 3004).

After the encryption communication path between the external terminal and management server is established, the management server communication processing unit 22 of the external terminal 11 transmits a request for connection to the internal terminal 15 to the management server 12 (Step 3005). The connection request contains the terminal ID which is information for identifying the connection partner (internal terminal 11).

The terminal communication processing unit 33 of the management server 12 received the connection request (Step 3006) makes the address registration/search unit 31 search the address of the internal terminal 15 from the authentication state table 60, by using the terminal ID as a key (Step 3007). If a message indicating an authentication success is not registered in the authentication result 63 corresponding to the internal communication terminal 15 in the authentication state table 60, i.e., if the encryption communication path is not established (No at Step 3008), the terminal communication processing unit 33 of the management server 12 executes an encryption communication establishing process for the internal terminal 15 (Step 3009) to thereafter advance to Step 3011. If a message indicating an authentication success is registered in the authentication result 63 corresponding to the internal communication terminal 15 in the authentication state table 60 (Yes at Step 3008), the key generation/distribution unit 32 of the management server 12 generates an encryption key and setting information to be used for encrypting the communication path between both terminals (Step 3010). The terminal communication processing unit 33 of the management server 12 transmits to the internal terminal 15 a connection request from the external terminal 11 to the internal terminal 15 and the encryption key and setting information generated at Step 3010 (Step 3011). In this case, the connection request, setting information and the like are transmitted by using the encryption communication path between the internal terminal and management server.

The management server communication processing unit 22 of the internal terminal 15 stores the encryption key and setting information received from the management server 12 (Step 3012) in the encryption key holding unit 26. It is checked whether the external terminal 11 can be coupled to the internal terminal 15 (Step 3012), and the judgment result is transmitted to the management server 12 (Step 3013). The terminal communication processing unit 33 of the management server 12 receives the judgment result from the internal terminal 15 (Step 3014).

If it is judged that the external terminal 11 cannot be coupled to the internal terminal 15 (No at Step 3101), the terminal communication processing unit 33 of the management server 12 transmits the judgment result indicating a rejected connection to the external terminal 11 (Step 3102) to terminate the process of establishing the encryption communication path between terminals.

If the external terminal 11 can be coupled to the internal terminal 15 (Yes at Step 3101), the terminal communication processing unit 33 of the management server 12 transmits the judgment result indicating a permitted connection and the encryption key and setting information generated at Step 3010, to the external terminal 11 (Step 3013). In this case, at least the encryption key is transmitted by using the encryption communication path between the external terminal and management server.

The management server communication processing unit 22 of the external terminal 11 receives the judgment result indicating whether communication with the internal terminal 15 is possible, and the like from the management server, and if the encryption key is received, stores the encryption key in the encryption key holding unit 26 (Step 3104).

If the judgment result is the rejected connection (No at Steps 3105 and 3106), the external terminal 11 and internal terminal 15 terminate the process of establishing the encryption communication path between terminals (Step 3107). If the judgment result is the permitted connection (Yes at Steps 3105 and 3106), the encryption communication path between terminals is established between the external terminal 11 and internal terminal 15 (Step 3107). By using the encryption communication path between terminals, the terminal communication processing unit 23 of the external terminal 11 and the terminal communication processing unit 23 of the internal terminal 15 can exchange information (Step 3108).

When the communication path becomes unnecessary between the external terminal 11 and internal terminal 15, the encryption communication path between terminals can be released. In releasing the encryption communication path between terminals, the following Steps are executed.

The management server communication processing unit 22 of the external terminal 11 transmits a disconnection request for encryption communication with the internal terminal 15, to the management server 12 (Step 3109). The terminal communication processing unit 33 of the management server 12 (Step 3110) transfers the received disconnection request to the internal terminal 15 (Step 3111). When the management server communication processing unit 22 of the internal terminal 15 receives the disconnection request (Step 3112), a corresponding disconnection response is transmitted to the management server 12 (Step 3113), and the terminal communication processing unit 23 releases the encryption communication path between terminals for the external terminal 11 (Step 3117). After receiving the disconnection response from the internal terminal 15 (Step 3114), the terminal communication processing unit 33 of the management server 12 transfers the disconnection response to the external terminal 11 (Step 3115). When the management server communication processing unit 22 of the external terminal 11 receives the disconnection response from the management server 12 (Step 3116), the terminal communication processing unit 23 terminates the encryption communication path between terminals for the internal terminal 15 (Step 3117).

Instead of transmitting the disconnection request from the external terminal 11, this request may be transmitted from the internal terminal 15. In this case, the processes at Steps 3109 to 3117 are executed by the internal terminal 15 in place of the external terminal 15.

In order to terminate communications, the external terminal 11 and internal terminal 15 are not necessarily required to execute Steps 3109 to 3117, but communication may be terminated without executing these Steps.

As illustratively shown in the flow charts of FIGS. 9 and 10, the management server 12 authenticates the external terminal 11 and internal terminal 15, and when authentication of these communication terminals can be confirmed, the encryption communication path is established between the external terminal 11 and internal terminal 15. After the encryption communication path between terminals is established, encryption communication can be performed between communication terminals without involving the management server 12. Secure communication is therefore possible without imposing a load on the management server 12. Furthermore, since the whole encryption path between terminals are encrypted, communications securer than conventional techniques become possible.

In this embodiment, when the encryption communication path between terminals is established, a partner communication terminal (in this embodiment, the internal terminal 15) and management server 12 establish first the encryption communication path between the communication terminal and management server to execute the address registration process (Steps 3001 and 3002). The embodiment is not limited to this. Instead, address registration for the partner internal terminal 15 is performed beforehand or statically, the source communication terminal (in this embodiment, the external terminal 11) issues a connection request for the destination communication terminal to the management server 12, and thereafter (at the timing of Yes at Step 3008), the encryption communication path is established between the destination terminal and management server 12.

For example, at a communication terminal which frequently receives a connection request from a plurality of terminals, such as an application server for providing services to other terminals, similar to the internal terminal of the embodiment, the encryption communication path for the management server 12 is established beforehand, and when a connection request is issued from the internal terminal 15, the encryption communication path is established immediately similar to the path between terminals to thereby provide services.

Conversely, if the internal terminal 15 has a low reception frequency of connection requests from the external terminal 11, the encryption communication path between the internal terminal 15 and management server 12 is established at the timing when the external terminal 11 issues a connection request to the internal terminal 15.

Next, description will be made on an operation to be executed when the external terminal 11 accesses the AP server 14 via the internal terminal 15 in the communication system of this embodiment. For example, in the state that the external terminal 11 coupled to the Internet operates through remote access to the internal terminal coupled to the network of a corporation, there is a case in which the internal terminal 15 uses services of the AP server 14. In this case, input information from a keyboard or a mouse is transmitted from the external terminal 11 to the internal terminal 15, and in accordance with this information, the internal terminal 15 exchanges information with the AP server 14. Screen information and the like acquired through information exchange between the internal terminal 15 and AP server 14 are transmitted from the internal terminal 15 to the external terminal 11 to provide the information to a user.

Figure 11:
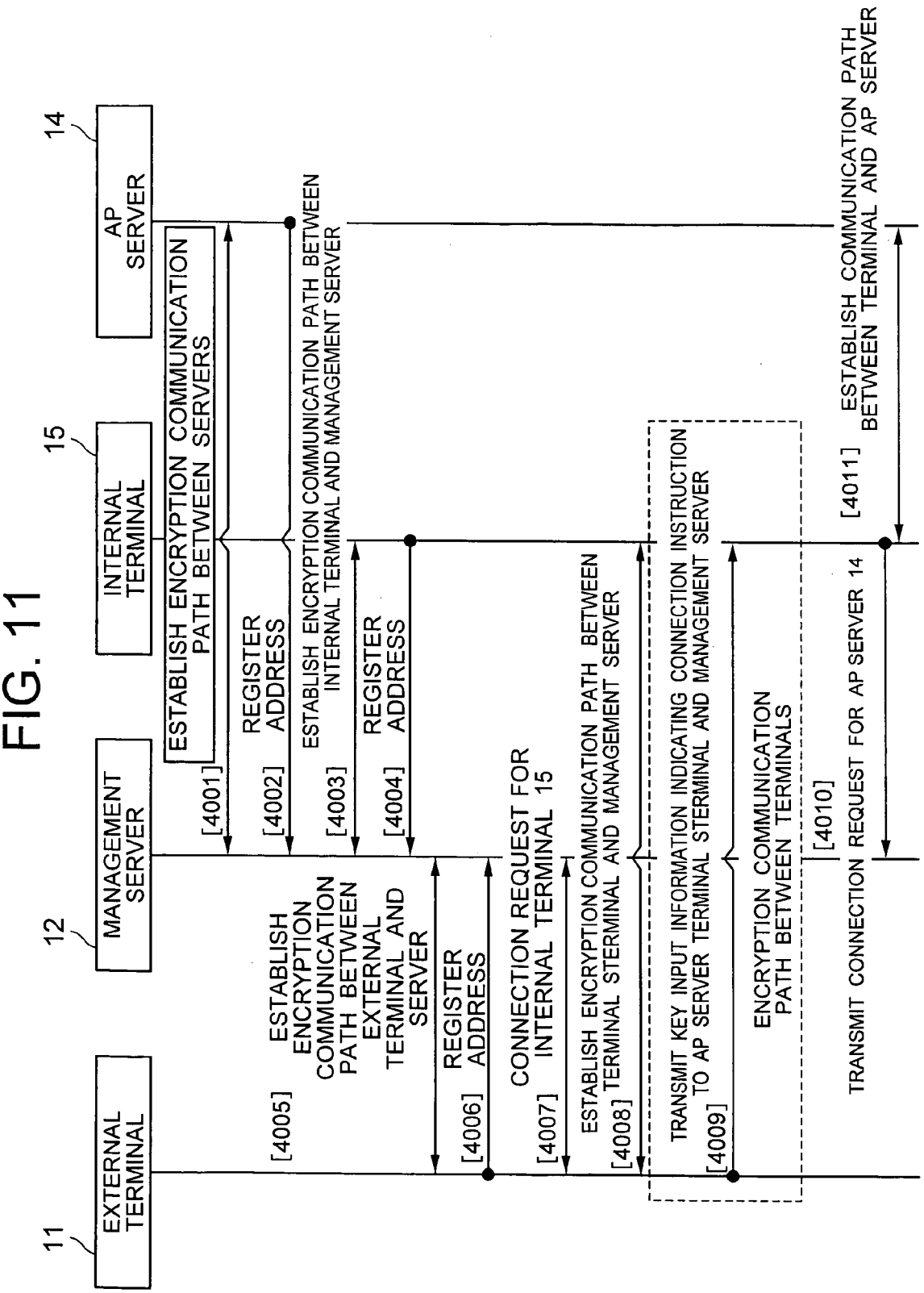
FIG. 11 is a flow chart illustrating a process sequence by which encryption communication paths between internal terminal and AP server are formed between the external terminal 11 and internal terminal 15 and between the internal terminal and AP server 14, when the external terminal 11 is coupled to the AP server 14 via the internal terminal 15, according to a first embodiment.
Figure 12:
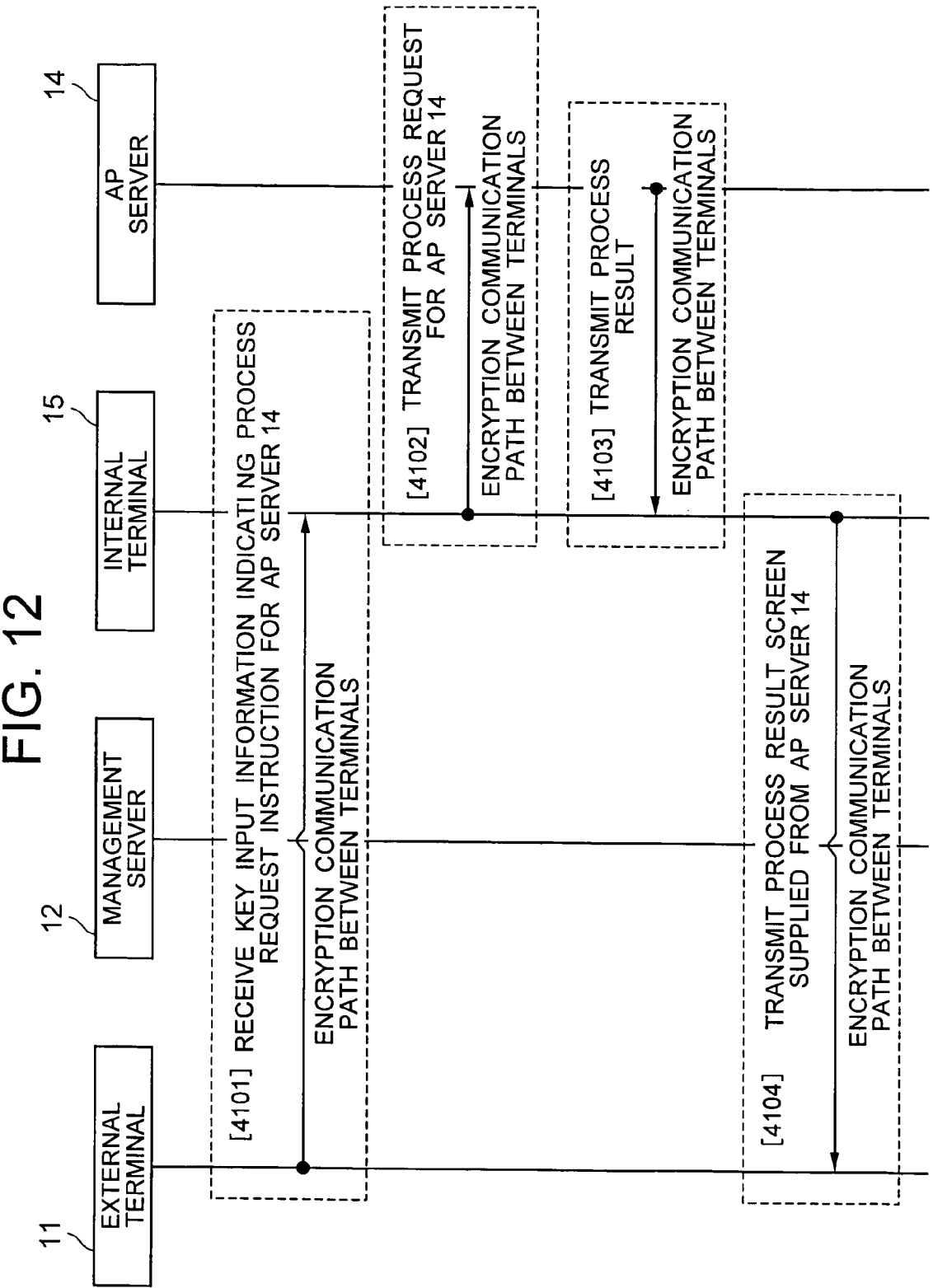
FIG. 12 is a flow chart illustrating a process sequence by which information is sent via an encryption communication path, when the external terminal 11 is coupled to the AP server 14 via the internal terminal 15, according to the first embodiment.

FIGS. 11 and 12 are flow charts illustrating an operation to be performed when the external terminal 11 accesses the AP server 14 via the internal terminal 15.

In the processes shown in FIGS. 11 and 12, the AP server 14 can be considered as one of the internal terminals 15. Therefore, the AP server 14 and management server 12 first execute Steps 1001 to 1016 and Steps 1101 to 1104 for the management server 12 and internal terminal 15 shown in FIGS. 6 and 7 to thereby establish beforehand the encryption communication path between the management server and AP server (called the encryption communication path between the management server and AP server) (Step 4001). If the AP server 14 does not still register its address, Steps 2002 to 2006 shown in FIG. 8 are executed to register the address of the AP server 14 in the management server 12 (Step 4002).

Similarly, the internal terminal 15 and management server 12 execute Steps 1001 to 1016 shown in FIG. 6 and Steps 1101 to 1104 shown in FIG. 7 to thereby establish beforehand the encryption communication path between the internal terminal and management server (Step 4003). If the internal terminal 15 does not still register its address, Steps 2002 to 2006 shown in FIG. 8 are executed to register the address in the management server 12 (Step 4004).

Similarly, the external terminal 11 executes the following Steps to establish the encryption communication path between terminals to the internal terminal 15.

The external terminal 11 and management server 12 first execute Steps 1001 to 1016 shown in FIG. 6 and Steps 1101 to 1104 shown in FIG. 7 for the internal terminal 15 and management server 12 to thereby establish the encryption communication path between the external terminal and management server (Step 4005). If the external terminal 11 does not still register its address, Steps 2002 to 2006 shown in FIG. 8 are executed to register the address of the external terminal 11 in the management server 12 (Step 4006).

After the encryption communication path between the external terminal and management server is established, the management server communication processing unit 22 of the external terminal 11 transmits a connection request for the internal terminal 15 to the management server 12 (Step 4007). The management server 12, external terminal 11 and internal terminal 15 execute Steps 3007 to 3107 shown in FIGS. 9 and 10 to establish the encryption communication path between the external terminal 11 and internal terminal 15 (Step 4008).

Next, the terminal communication processing unit 23 of the external terminal 11 transmits key input information indicating a connection request for the AP server 14 to the internal terminal, in order to communicate with the AP server 14 via the internal terminal 15 (Step 4009). This connection request is transmitted via the encryption communication path between terminals established at Step 4008.

When the terminal communication processing unit 23 of the internal terminal 15 receives the key input information indicating a connection request for the AP server 14, in order to establish the encryption communication path between the internal terminal 15 and AP server 14 (called encryption communication path between the internal terminal and AP server), the internal terminal 15 and AP server execute processes corresponding to those for the external terminal 11 and internal terminal 15, at Steps 4007 and 4008. This encryption communication path can be considered as the encryption communication path between terminals established between the internal terminal 15 and AP server 14.

Namely, the management server communication processing unit 22 of the internal terminal 11 transmits a connection request for the AP server 14 to the management server 12 (Step 4010). When the management server 12 receives the connection request for the AP server 14, the management server 12, internal terminal 15 and AP server 14 execute Steps 3007 to 3107 shown in FIGS. 9 and 10 to establish the encryption communication path between the internal terminal and AP server (Step 4011). It is not necessary to establish again the encryption communication path between the internal terminal and management server and the encryption communication path between the AP server and management server, because these paths were established at Steps 4001 and 4003.

The external terminal 11 can perform encryption communication with the AP server 14 via the internal terminal 15 by using the two encryption communication paths established by these Steps, i.e., the encryption communication path between the external terminal and internal terminal and the encryption communication path between the internal terminal and AP server.

Namely, the terminal communication processing unit 23 of the external terminal 11 transmits the key input information indicating a process request for the AP server 14 to the internal terminal 15, by using the encryption communication path between terminals established for the internal terminal 15 (Step 4101). When the terminal communication processing unit 23 of the internal terminal 15 receives from the external terminal 11 the key input information indicating a process request for the AP server 14, the process request based on the received input key information is transmitted to the AP server 14, by using the encryption communication path between the internal terminal and AP server established for the AP server 14 (Step 4102). When the terminal communication processing unit 23 of the AP server 14 receives the process request from the internal terminal 15, the AP server 14 executes the requested process. The terminal communication processing unit 23 of the AP server 14 transmits the execution result of the requested process to the internal terminal 15, by using the encryption communication path between the internal terminal and AP server (Step 4103). After receiving the execution result, the terminal communication processing unit 23 of the internal terminal 15 transmits the process result or output information to a screen generated from the process result, to the external terminal 11, by using the encryption communication path between terminals (Step 4104). The terminal communication processing unit 23 of the external terminal 11 receives the output information and outputs the information from the input/output unit 20c to the screen or the like.

By executing these Steps, the external terminal 11 can perform secure communication with the AP server via the internal terminal 15.

Second Embodiment

Figure 14:
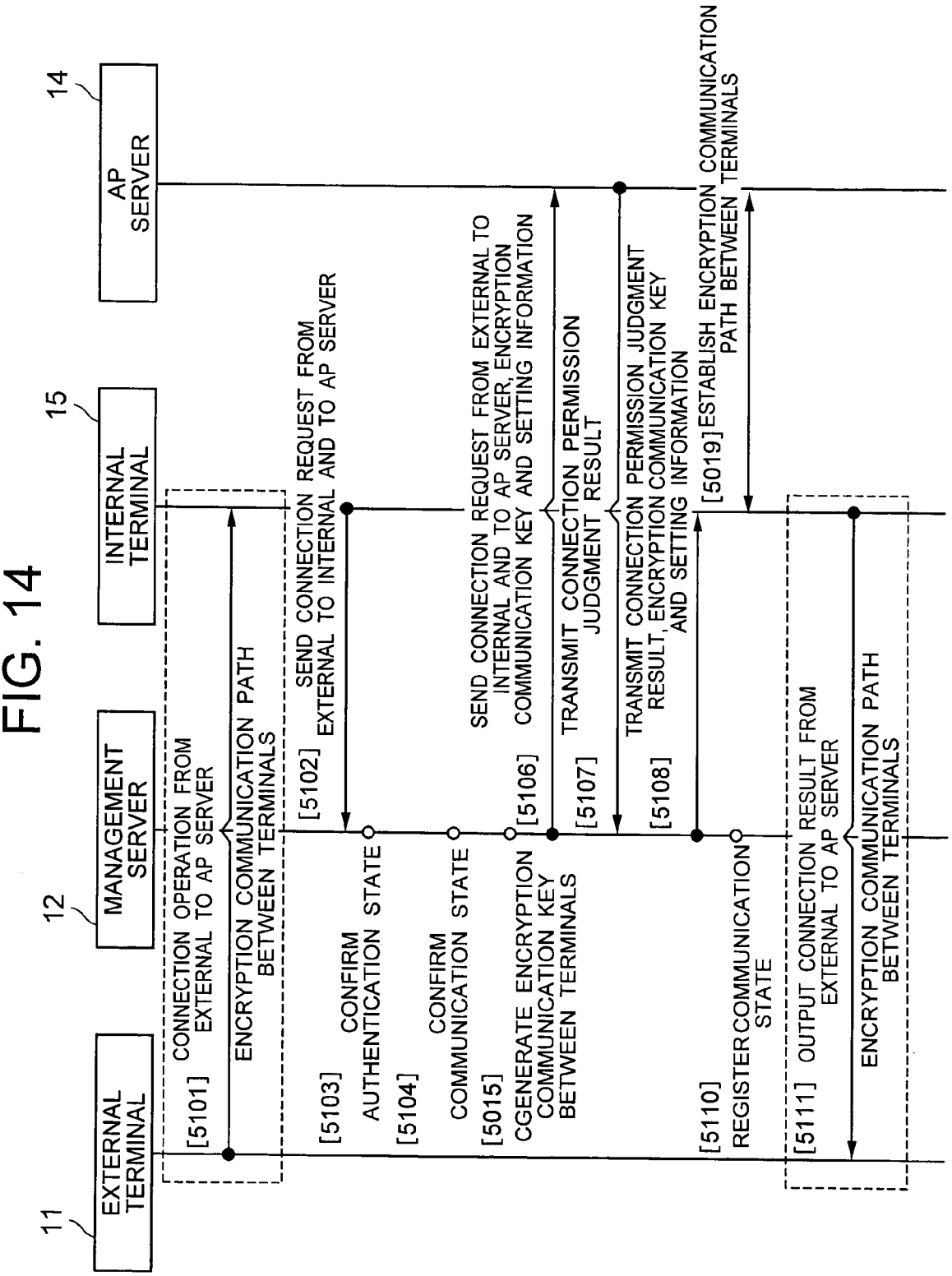
FIG. 14 is a flow chart illustrating a process sequence by which an encryption communication path between the internal terminal and AP server is established, when the external terminal 11 is coupled to the AP server 14 via the internal terminal 15, according to the second embodiment.
Figure 15:
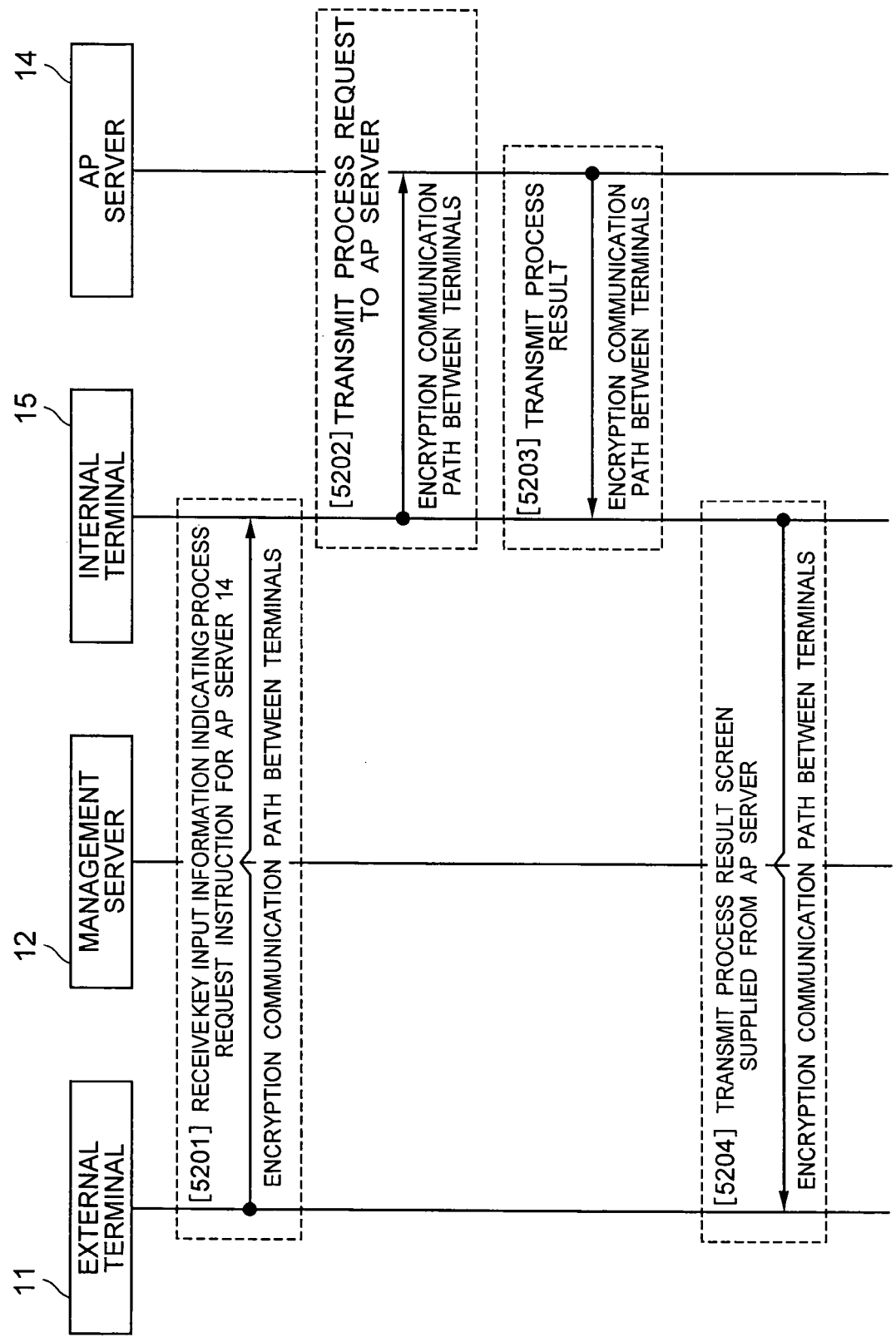
FIG. 15 is a flow chart illustrating a process sequence by which information is sent via an encryption communication path, when the external terminal 11 is coupled to the AP server 14 via the internal terminal 15, according to the second embodiment.

The second embodiment will be described. In the second embodiment, the operation as illustratively shown in FIGS. 13 to 15 is performed when the external terminal 11 accesses the AP server 14 via the internal terminal 15.

Figure 13:
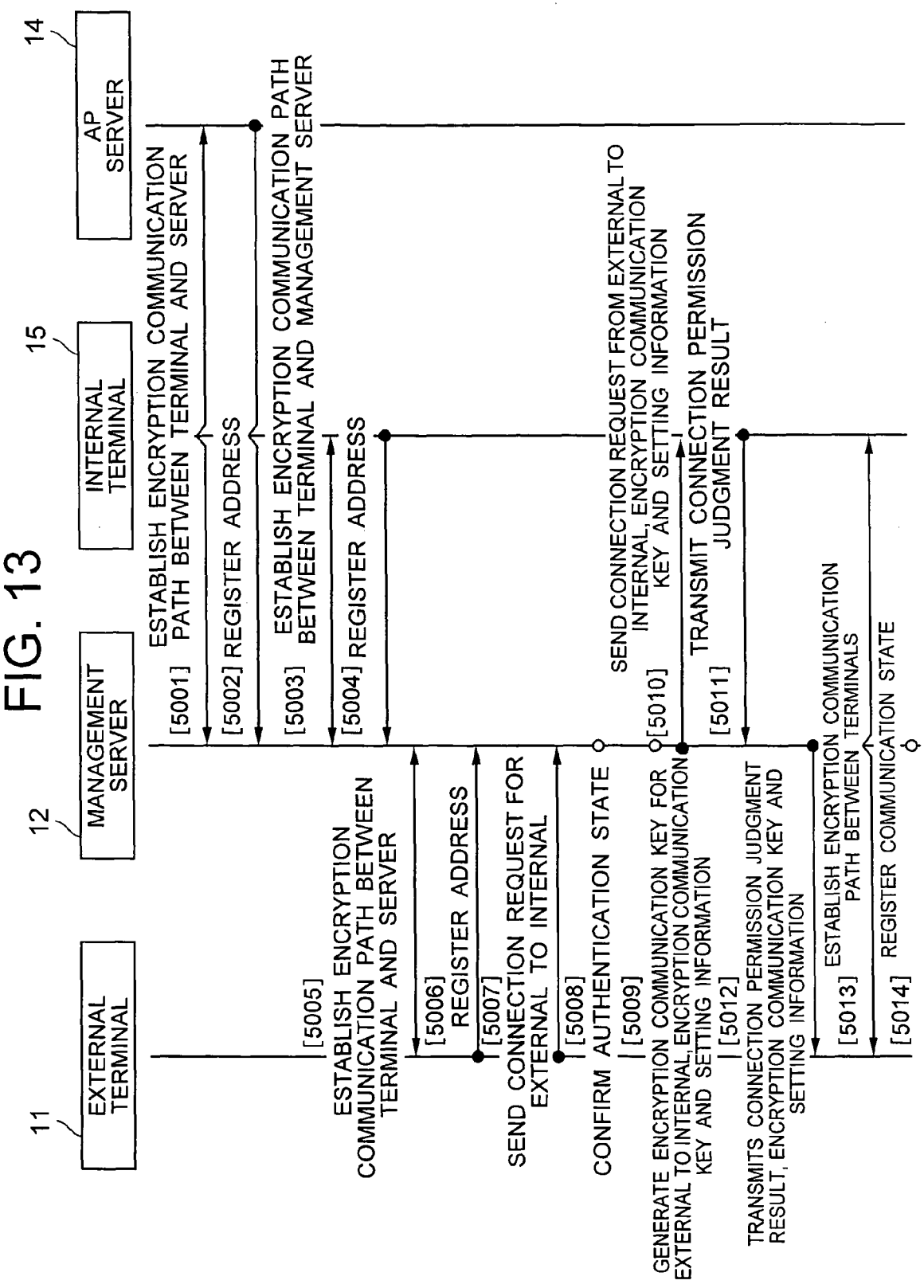
FIG. 13 is a flow chart illustrating a process sequence by which an encryption communication path between terminals is established, when the external terminal 11 is coupled to the AP server 14 via the internal terminal 15, according to a second embodiment.

As shown in FIG. 13, the AP server 14 and management server 12 execute Steps 1001 to 1016 and Steps 1101 to 1104 for the management server 12 and internal terminal 15 shown in FIGS. 6 and 7 to thereby establish beforehand the encryption communication path between the terminal and server (Step 5001). If the AP server 14 does not still register its address, Steps 2002 to 2006 shown in FIG. 8 are executed to register the address of the AP server 14 in the management server 12 (Step 5002).

If Steps 5001 and 5002 are executed normally, the address information and authentication result of the AP server 14 are registered in the authentication state table 60. More specifically, the address information of the AP server 14 is registered in the terminal address 61 and terminal IP address 62. As the corresponding authentication result, a message indicating an authentication success and its time are registered in the authentication result 63 and authentication time 64, respectively.

The authentication state table 60 is used for registering the states of various terminals for which the management server 12 authenticates and accepts registration of address information, and held in the storage unit 30b of the management server 12.

Similarly, the internal terminal 15 and management server 12 execute Steps 1001 to 1016 and Steps 1101 to 1104 shown in FIGS. 6 and 7 for the internal terminal 15 and management server 12 to thereby establish beforehand the encryption communication path between the internal terminal and management server (Step 5003). If the internal terminal 15 does not still register its address, Steps 2002 to 2006 shown in FIG. 8 are executed to register the address in the management server 12 (Step 5004).

If Steps 5003 and 5004 are executed normally, the address information and authentication result of the internal terminal 15 are registered in the authentication state table 60.

The external terminal 11 executes the following Steps in order to establish the encryption communication path between terminals for the internal terminal 15.

The external terminal 11 and management server 12 execute Steps 1001 to 1016 and Steps 1101 to 1104 shown in FIGS. 6 and 7 for the internal terminal 15 and management server 12 to thereby establish the encryption communication path between the external terminal and management server (Step 5005). If the external terminal 11 does not still register its address, Steps 2002 to 2006 shown in FIG. 8 are executed to register the address of the external terminal 11 in the management server 12 (Step 5006).

If Steps 5003 and 5004 are executed normally, the address information and authentication result of the external terminal 11 are registered in the authentication state table 60.

Thereafter, the management server communication processing unit 22 of the external terminal 11 transmits a connection request for the internal terminal 15 to the management server 12 (Step 5007). After receiving the connection request for the internal terminal 15, the terminal communication processing unit 33 of the management server 12 confirms the authentication states of the external terminal 11 and internal terminal 15 (Step 5008). More specifically, the terminal communication processing unit 33 of the management server 12 refers to the authentication state table 60 and confirms whether the address information of the external terminal 11 and internal terminal 15 is registered and a message indicating an authentication success is registered in the authentication result field. If the address information is not registered, the management server 12 notifies the external terminal 11 of a connection request rejection. Although the address information is registered, if the message indicating the authentication success is not registered in the authentication result field, the terminal communication processing unit 33 of the management server 12 performs the encryption communication path establishing process for the internal terminal 15 to confirm the authentication state. If the authentication state cannot be confirmed again, the management server 12 notifies the external terminal 11 of a connection request rejection.

If the authentication state can be confirmed, the key generation/distribution unit 32 of the management server 12 generates an encryption key for using the encryption communication path between terminals (Step 5009). The terminal communication processing unit 33 of the management server 12 transmits a connection request from the external terminal 11 to the internal terminal 15 and the encryption key and setting information generated at Step 5009, to the internal terminal 15 (Step 5010).

After receiving the connection request, the encryption key and the setting information, the management server communication processing unit 22 of the internal terminal 15 judges whether the external terminal 11 can be coupled to the internal terminal 15, and transmits a connection permission judgment result to the management server 12 (Step 5011). The terminal communication processing unit 33 of the management server 12 transmits to the external terminal 11 the connection permission judgment result and the encryption key and setting information generates at Step 5009 if the judgment result indicates a connection permission (Step 5012). Reception of this by the management server communication processing unit 22 of the external terminal 11 means that the encryption communication path between terminals is established. Therefore, the terminal communication processing unit 23 of the external terminal 11 and the terminal communication processing unit 23 of the internal terminal 15 can perform encryption communication by using the encryption keys received at Steps 5010 and 5012 (Step 5013).

Establishment of the encryption communication path between the external terminal 11 and internal terminal 15 is registered in a communication state table 70 as shown in FIG. 17 by the terminal communication processing unit 33 of the management server 12 (Step 5014). More specifically, an address of the connection request source (external terminal 11) is registered in a communication source address 71 of the communication state table 70, an address of the connection request destination (internal terminal 15) is registered in a communication destination address 72, and a time (e.g., times when the terminals received the encryption keys and setting information) when the encryption communication path between terminals was established) is registered in a communication start time 73.

The communication state table 70 is used for registering the state of each established encryption communication path between terminals for which the management server 12 authenticates and generates the encryption key, and held in the storage unit 30b.

Next, in order to communicate with the AP server 14 via the internal terminal 15, the terminal communication processing unit 23 of the external terminal 11 transmits key input information indicating a connection request instruction for the AP server 14 to the internal terminal 15 (Step 5101). This connection request is transmitted to the internal terminal 15, by using the encryption communication path between terminals established at Step 5016.

When the terminal communication processing unit 23 of the internal terminal 15 receives the key input information indicating the connection request instruction for the AP server 14 from the external terminal 11, the following operation is performed in order to establish the encryption communication path between the internal terminal 15 and AP server 14.

The management server communication processing unit of the internal terminal 15 transmits a connection request for the AP server 14 from the external terminal 11 to the internal terminal 15, to the management server 12 (Step 5102). Namely, this connection request contains information on the external terminal 11 to be authenticated, because the external terminal 11 requests for establishing the encryption communication path between the internal terminal 15 and AP server 14 to access the AP server 14. Therefore, as shown in FIG. 18, a connection request 80 with authentication object information containing authentication object information 83 is sent as the connection request, in addition to communication source information 81 and communication information destination information 82. The connection request also contains other information necessary for communication and application information 84.

After receiving the connection request 80 with authentication object information, the terminal communication processing unit 33 of the management server 12 confirms the authentication states of the external terminal 11, internal terminal 15 and AP server 14 written as the communication source information 81, communication destination information 82 and authentication object information 83 (Step 5103). More specifically, the management server 12 refers to the authentication state table 60 to confirm whether the address information on the external terminal 11, internal terminal 15 and AP server 14 is registered and whether a message indicating an authentication success is registered in the authentication result 63 field. If the address information is not registered, the management server 12 notifies the internal terminal 15 of a connection request rejection. Although the address information is registered, if the message indicating the authentication success is not registered in the authentication result field, the terminal communication processing unit 33 of the management server 12 performs the encryption communication path establishing process for the AP server 14 to confirm the authentication state. If the authentication state cannot be confirmed again, the management server 12 notifies the internal terminal 15 of a connection request rejection.

Since the external terminal 11 is also an authentication object in this embodiment, if the authentication state can be confirmed, the terminal communication processing unit 33 of the management server 12 establishes the encryption communication path between the communication source (internal terminal 15) and authentication object (external terminal 11) written in the connection request 80 with authentication object information, and confirms communication by referring to the communication state table 70 (Step 5104). More specifically, the terminal communication processing unit 33 of the management server 12 refers to the communication state table 70 to confirm that the internal terminal 15 and external terminal 11 are written in the communication source address and communication destination address, respectively and that the state is the communication state. If the authentication state and communication state are confirmed, the key generation/distribution unit 32 of the management server 12 generates an encryption key for using the encryption communication path between the internal terminal 15 and AP server 14 (Step 5105). The terminal communication processing unit 33 of the management server 12 transmits a connection request from the external terminal 11 to the internal terminal 15 via the AP server 14 and the encryption key and setting information generated at Step 5105, to the AP server 14 (Step 5106).

After receiving the connection request, the encryption key and the setting information, the management server communication processing unit 22 of the AP server 14 judges whether the external terminal 11 can be coupled to the AP server 14 via the internal terminal 15, and transmits a connection permission judgment result to the management server 12 (Step 5107). The terminal communication processing unit 33 of the management server 12 transmits to the internal terminal 14 the connection permission judgment result and the encryption key and setting information generated at Step 5105 if the judgment result indicates a connection permission (Step 5108). Reception of this by the management server communication processing unit 22 of the internal terminal 15 means that the encryption communication path between the internal terminal and AP server is established. Therefore, the terminal communication processing unit 23 of the internal terminal 15 and the terminal communication processing unit 23 of the AP server 14 can perform encryption communication by using the encryption keys received at Steps 5106 and 5108 (Step 5109).

Establishment of the encryption communication path between the internal terminal 15 and AP server 14 is registered in the communication state table 70 as shown in FIG. 17 by the terminal communication processing unit 33 of the management server 12 (Step 5110). Even if the AP server 14 issues a process request to another communication terminal to acquire the process result from the other communication terminal, the encryption communication path can be established by using the external communication terminal as the authentication object, by repeating processes similar to those described above.

By referring to the communication state table 70, the management server 12 can know a correspondence between two established encryption communication paths (between the external terminal 11 and internal terminal 15 and between the internal terminal 15 and AP server 14). It is therefore possible to grasp which of three apparatus is executing processes in cooperation with each other.

The terminal communication processing unit 23 of the internal terminal 15 notifies the external terminal 11 of the connection result, after the encryption communication path between terminals is established (Step 5111).

By executing the above-described Steps, the external terminal 11 can perform encryption communication with the AP server 14 via the internal terminal 15, by using the two established encryption communication paths (between the external terminal 11 and internal terminal 15 and between the internal terminal 15 and AP server 14). Namely, the terminal communication processing unit 23 of the external terminal 11 transmits key input information indicating a process request instruction for the AP server 14 to the internal terminal 15 (Step 5201).

After receiving the key input information indicating the process request instruction for the AP server 14 from the external terminal, the terminal communication processing unit 23 of the internal terminal 15 transmits the received process request based on the received key input information to the AP server 14, by using the encryption communication path between the internal terminal and AP server established for the AP server 14 (Step 5202). After receiving the process request from the internal terminal 15, the terminal communication processing unit 23 of the AP server 14 executes the requested process. The terminal communication processing unit 23 of the AP server 14 transmits the execution result of the requested process to the internal terminal 15, by using the encryption communication path between the internal terminal and AP server (Step 5203). After receiving the execution result, the terminal communication processing unit 23 of the internal terminal 15 transmits the process result or output information to a screen or the like generated from the process result, to the external terminal 11, by using the encryption communication path between terminals (Step 5204). After receiving this output information, the terminal communication processing unit 23 of the external terminal 11 outputs the output information to a screen or the like via the input/output unit 20c.

By executing the above-described Steps, the external terminal 11 can perform secure communication with the AP server 14 via the internal terminal 15.

In the communication system of the above-described two embodiments, each communication terminal including the external terminal 11, internal terminal 15 and AP server 14 can communicate with each other in accordance with the authentication result if authentication with the management server 12 is once performed, and authentication specific to the AP server such as ID and a password is not necessary. Namely, the management server 12 collectively performs authentication of the external terminal 11, internal terminal 15 and AP server 14. Therefore, when the external terminal 11 accesses the AP server 14 via the internal terminal 15, it is not necessary to perform a plurality type of authentications as conventional, and management of authentication information can be simplified.

Although the configuration of the first embodiment does not contain the communication state table 70, the first embodiment may also be provided with the communication state table 70. In this case, by referring to the communication state table, the management server 12 can grasp a correspondence between two established encryption communication paths (between the external terminal 11 and internal terminal 15 and between the internal terminal 15 and AP server 14), and can grasp which of three apparatus is executing processes in corporation with each other.

Further, in any one of the embodiments, even in the encryption communication state in which at least one of the external terminal 11, internal terminal 15 and AP server 14 has a plurality of apparatus of the same kind, the communication states can be managed and grasped if the management server 12 is provided with the authentication state table 60 and communication state table 70.

Furthermore, if the authentication process to be executed by the AP server 14 requires strict authentication on the PKI base using an IC card or the like owned by a user, it is necessary for the configuration of the first embodiment to use an IC card at the internal terminal 15. This is not necessary for the second embodiment, but a user can use the IC card at the external terminal the user actually uses. Namely, when the external terminal 11 accesses the AP server 14 via the internal terminal 15, the AP server 14 can be accessed in accordance with the authentication result of the IC card owned by the user operating the external terminal 11. It is therefore possible to access the AP server 14 in accordance with the user privilege so that more secure communication can be performed. In addition, a user can access the AP server 14 by using various external terminals at various sites, so that use convenience can be improved.

The first and second embodiments illustratively show communication effected by designating a communication terminal. Instead, a user using a communication terminal may be designated. If a user using a communication terminal is designated, a public key certificate and a user ID of the user are stored beforehand in the portable storage medium 58, the communication terminal detects an insertion of the storage medium into the reader 57 of the communication terminal, and the attributes of the user are read and stored. With this arrangement, the communication terminal can identify the user and can be designated as a communication partner. It is configured in such a manner that when the user dismounts the portable storage medium 58 from the reader 57, the communication terminal deletes the user attributes.

When the user attributes are stored in the communication terminal, the address registration process shown in FIG. 8 is executed, whereas when the user attributes are deleted from the communication terminal, the processes shown in FIG. 8 with the "register" being replaced with the "delete" are executed. In this manner, as the management server 12 manages the user ID and communication terminal address, the management server 12 can judge whether a destination user is using the communication terminal while another communication terminal issues a connection request, and if the communication terminal is being used, it is possible to judge which communication terminal is being used, without making the user of the other communication terminal execute a connection process. The connection process can therefore be simplified.

In any of the embodiments, there is a case in which the external terminal 11 uses a plurality of AP servers 14 via the internal terminal 15. For example, the internal terminal executes a plurality of application programs for accessing different AP servers and the external terminal operates the application programs through transmission of input information such as information from a keyboard and reception of multi-window screen information.

Used in this case are one encryption communication path between the external terminal and internal terminal and a plurality of encryption communication paths between the internal terminal and AP servers. Namely, in FIG. 11, each AP server executes Steps 4001 to 4004, and the processes at Step 4009 and following Steps are executed for each application program running on the internal terminal, and screen information output from the plurality of application programs is transmitted as one screen at Step 4104.

In both the embodiments, the external terminal 11 remotely operates the internal terminal 15, i.e., through exchange of input information from a keyboard or a mouse and output information, services are provided from the AP server 14. However, the invention is not limited to this arrangement. The external terminal 11 may issue a process request command to the internal terminal 15 to receive process result information (e.g., a return value of the command representative of the process result) through information exchange between the internal terminal 15 and AP server 14.

In the above description, it is assumed that the internal terminal 15 establishes the encryption communication path and registers the address in advance. In another application example, the management server 12 may perform the process of establishing the encryption communication path for the internal terminal 15, after the external terminal 11 issues a connection request for the internal terminal 15 whose address is registered in the management server 12.

In the first and second embodiments, although the management server 12 transmits setting information as well as the encryption key, it is sufficient if items necessary for encryption communication to be newly started are transmitted. For example, if an algorithm and a key length are identified beforehand, it is not necessary to be transmitted.

Furthermore, although the communications between communication terminals are encrypted in the first and second embodiments, if encryption is not necessary, encryption may not be performed.

For example, communications between the internal terminal 15 and AP server 14 are performed in the intra-organization network 16, encryption may not be performed if it is unnecessary. In this case, of the setting information to be sent to each communication terminal from the management server 12, a message indicating "no encryption" may be set as the information representative of encryption algorithm.

The first and second embodiments may be combined as desired.

The specification and drawings are, accordingly, to be regarded in an illustrative rather than a restrictive sense. It will, however, be evident that various modifications and changes may be made thereto without departing from the spirit and scope of the invention as set forth in the claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An encrypting communication method for a communication system including an internal communication terminal coupled to an intra-organization network, an external communication terminal for accessing the internal communication terminal from outside of the intra-organization network, and a management server for managing the internal communication terminal and the external communication terminal, wherein:

the internal communication terminal, in response to success of validation for a certificate of the management server, performs a first authentication for the management server, and establishes a first encryption communication path between the internal communication terminal and the management server after the first authentication is successfully performed, the internal communication terminal being configured not to establish a communication path operable under encryption with the management server in response to failure of the first authentication;

the external communication terminal performs a second authentication for the management server, establishes a second encryption communication path between the external communication terminal and the management server after the second authentication is successfully performed, and transmits a connection request for the internal communication terminal to the management server through the second encryption communication path between the external communication terminal and the management server, the external communication terminal being configured not to establish a communication path operable under encryption with the management server in response to failure of the second authentication;

the management server generates an encryption communication key for encrypting communication between the external communication terminal and the internal communication terminal and setting information for the encrypting communication, and transmits together the connection request for connection received from the external communication terminal, the generated encryption communication key, and the setting information to the internal communication terminal by using the established first encryption communication path between the internal communication terminal and the management server;

the internal communication terminal supplies a judgment result as to whether the connection request from the external communication terminal is permitted, to the management server through the first encryption communication path between the internal communication terminal and the management server;

if the judgment result received from the internal communication terminal indicates that the connection request is permitted, the management server transmits the generated encryption communication key to the external communication terminal via the established second encryption communication path between the external communication terminal and management server;

the external communication terminal and the internal communication terminal establish a third encryption communication path between the external communication terminal and the internal communication terminal, by using the encryption communication key respectively received at the external communication terminal and at the internal communication terminal from the management server; and the external communication terminal performs encryption communication with the internal communication terminal without involving the management server through the established third encryption communication path between the external and internal communication terminals.

2. The encrypting communication method according to claim 1, wherein the communication system further comprises a validation server for validating a certificate is further provided, wherein:

the management server asks the validation server about certificate validation of each of the internal communication terminal and the external communication terminal when each of the external and internal communication terminals is authenticated for establishing the first encryption communication path between the internal communication terminal and the management server and the second encryption communication path between the external communication terminal and the management server;

the validation server supplies a result of execution of a validation process for the certificate to the management server; and the management server judges that authentication of the external communication terminal and/or the internal communication terminal succeeds only when the validation result supplied from the validation server indicates a success.

3. The encrypting communication method according to claim 1, wherein:

the communication system is a communication system having a structure that an application server is further coupled to the intra-organization network for providing a business application;

the external communication terminal transmits a connection request for the application server to the internal communication terminal by using the established third encryption communication path between the internal and external communication terminals;

the internal communication terminal establishes an fourth encryption communication path between the internal communication terminal and the application server for the application server; and the external communication terminal communicates with the application server via the internal communication terminal by using both the third encryption communication path between the external communication terminal and the internal communication terminal, and the fourth encryption communication path between the internal communication terminal and the application server.

4. The encrypting communication method according to claim 3, wherein:

the application server performs an authentication in advance for the management server, and establishes a fifth encryption communication path between the application server and the management server;

the internal communication terminal transmits a connection request with authentication object information to the management server in order to establish the fourth encryption communication path between the internal communication terminal and the application server, the connection request with authentication object information being written with information on the internal communication terminal as communication source information, information on the application server as communication destination information, and information on the external communication terminal as authentication object information;

in response to an event of reception of the connection request with authentication object information, the management server confirms that both the internal communication terminal as a communication source, and the application server as a communication destination and the external communication terminal as an authentication object are already authenticated by the management server, and confirms that the internal communication terminal as the communication source and the external communication terminal as the authentication has already established the third encryption communication path between the communication terminals;

after each of the confirmations, the management server generates another encryption communication key for encrypting communication between the internal communication terminal and the application server, and transmits the generated another encryption communication key and the connection request with authentication object information to the application server by using the already established fifth encryption communication path between the application server and the management server;

the application server judges whether the connection request sent from the internal communication terminal, and supplies a judgment result to the management server;

if the judgment result received from the application server indicates a connection permission, the management server transmits the generated another encryption communication key to the internal communication terminal by using the second encryption communication path between communication terminal and management server, and establishes the fourth encryption communication path between the internal communication terminal and the application server; and the external communication terminal communicates with the application server via the internal communication terminal by using both the third encryption communication path between the terminals and the fourth encryption communication path between the internal communication terminal and the application server.

5. The encrypting communication method according to claim 4, wherein:

the management server manages an authentication state table registering either address information, an authentication state and an authentication time of the external communication terminal, or the internal communication terminal and the application server;

the management server registers an authentication result acquired when the fourth encryption communication paths are established among the external communication terminal, the internal communication terminal and a terminal of the application server, in the authentication state table; and in response to reception of the connection request with authentication object information from the internal communication terminal, the management server confirms whether the authentication state table registers an authentication success of the internal communication terminal, the external communication terminal and the external communication terminal of the authentication object.

6. The encrypting communication method according to claim 4, wherein:
in a step of the management server confirming in a description of the connection request with the authentication object information received from the internal communication terminal whether both the internal communication terminal as a source terminal and the external communication terminal as a terminal of the authentication object has already established the third encryption communication path between the communication terminals, the management server manages a communication state table registering communication source address information, communication destination address information and a communication start time of both the already established third and fourth encryption communication paths between the internal and external communication terminals and between the internal communication terminal and the application server; and
in response of the connection request with authentication object information from the internal communication terminal, the management server refers to the communication state table and confirms whether the internal communication terminal and the external communication terminal as the authentication object have already established the third encryption communication path between the communication terminals.

7. The encrypting communication method according to claim 3, wherein:
the external communication terminal transmits start control information for starting a process request for the application server to the internal communication terminal as a connection request to the application server by using the third encryption communication path between the terminals;
the internal communication terminal transmits a connection request for the application server to the management server, in accordance with the start control information received from the external communication terminal;
the management server generates an encryption key for performing encryption communication between the internal communication terminal and the application server without involving the management server, and transmits the encryption key to the internal communication terminal and the application server to establish the fourth encryption communication path between the internal communication terminal and the application server; and
in response to the start control information received from the external communication terminal, the internal communication terminal notifies the external communication terminal of establishment of the fourth encryption communication path between the internal terminal and the application server through the fourth encryption communication path between the terminals;
in response to the notice, the external communication terminal transmits control information for requesting the application server about a process to the internal communication terminal through the third encryption communication path between the terminals; and
the internal communication terminal requests the application server about the process in accordance with the process control information received from the external communication terminal, by using the fourth encryption communication path between the internal communication terminal and the application server;
receives a process result of the control information from the application server; and
transmits process result information on the process result to the external communication terminal by using the third encryption communication path between the terminals.

8. The encrypting communication method according to claim 7, wherein:
the process control information is input information for operating the internal communication terminal from the external communication terminal; and
the process control information is screen display information to be generated by the internal communication terminal and display the process result by the application server on a display screen of the external communication terminal.

9. The encrypting communication method according to claim 7, wherein:
the process control information is a process request command to be issued from the external communication terminal to the internal communication terminal; and
the process result information is a return value of a process result of the process request command by the application server.

10. The encrypting communication method according to claim 7, wherein:
when the connection request is transmitted to the application server from the internal communication terminal;
a connection request with authentication object information is transmitted which confirms that the external communication terminal has been authenticated and the third encryption communication path between the terminals has been established to the internal communication terminal.

11. The encrypting communication method according to claim 8, wherein:
when the management server generates the encryption keys to establish both the encryption communication path between the terminals;
the external communication terminal authenticates the internal communication terminal and the application server and the fourth encryption communication path between the internal communication terminal and the application server, and manages an authentication result.

12. The encrypting communication method according to claim 7, wherein the management server authenticates a user of the external communication terminal when the external communication terminal is authenticated.

13. The encrypting communication method according to claim 7, wherein the management server manages a correspondence between both a communication state of the third encryption communication path between the terminals and a communication state of the fourth encryption communication path between the internal communication terminal and the application server.

* * * * *